(12) United States Patent
Nishiura

(10) Patent No.: US 8,760,720 B2
(45) Date of Patent: Jun. 24, 2014

(54) IMAGE PROCESSING APPARATUS

(71) Applicant: KYOCERA Document Solutions Inc., Osaka (JP)

(72) Inventor: Mitsuko Nishiura, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 41 days.

(21) Appl. No.: 13/661,648

(22) Filed: Oct. 26, 2012

(65) Prior Publication Data

US 2013/0107296 A1  May 2, 2013

(30) Foreign Application Priority Data

Oct. 28, 2011 (JP) ................................ 2011-237078
Oct. 28, 2011 (JP) ................................ 2011-237079

(51) Int. Cl.
*H04N 1/60* (2006.01)
*G06K 1/00* (2006.01)

(52) U.S. Cl.
USPC ............ 358/1.9; 358/504; 358/527; 358/523; 358/538; 358/2.1; 382/162; 382/173

(58) Field of Classification Search
None
See application file for complete search history.

(56) References Cited

U.S. PATENT DOCUMENTS

| | | | |
|---|---|---|---|
| 6,701,011 B1 | 3/2004 | Nakajima | |
| 8,339,645 B2 * | 12/2012 | Nakawaki | ............ 358/1.15 |
| 2004/0227964 A1 * | 11/2004 | Fujino | ............ 358/1.9 |

FOREIGN PATENT DOCUMENTS

| | | |
|---|---|---|
| JP | 11--098374 A | 4/1999 |
| JP | 2004215235 A | 7/2004 |
| JP | 2007-053543 A | 3/2007 |
| JP | 2009-200741 A | 9/2009 |

OTHER PUBLICATIONS

Notice of Reasons for Rejection issued to JP Application No. 2011-237078 mailed Sep. 18, 2013.
Patent Abstract for JP 2004-215235.

* cited by examiner

*Primary Examiner* — Quang N Vo
(74) *Attorney, Agent, or Firm* — Knobbe Martens Olson & Bear LLP

(57) ABSTRACT

A pixel extracting unit extracts pixels belonging to a previously designated color range from the image data of a correction object. A target color selection receiving unit receives a selection of one target color by a user, from among a plurality of target colors stored in a target color storage unit. A color correction executing unit executes color correction on correction object image data, based on the color of the pixel extracted by the pixel extracting unit and the target color selected through the target color selection receiving unit. A target color extracting unit extracts the target color of a registration object from target color registration image data stored in a registration image storage unit. A target color registration unit registers the target color of the registration object extracted by the target color extracting unit in the target color storage unit to be associated with a previously designated color range.

9 Claims, 19 Drawing Sheets

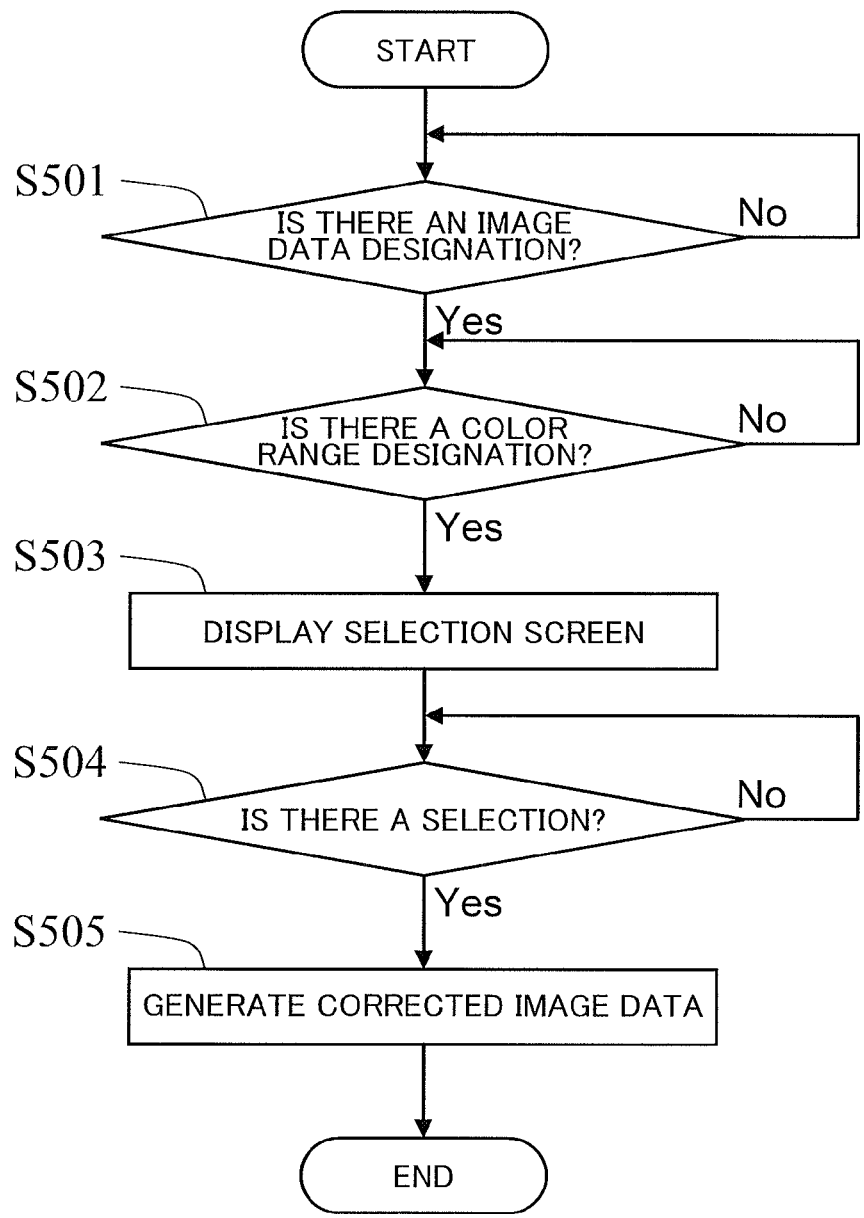

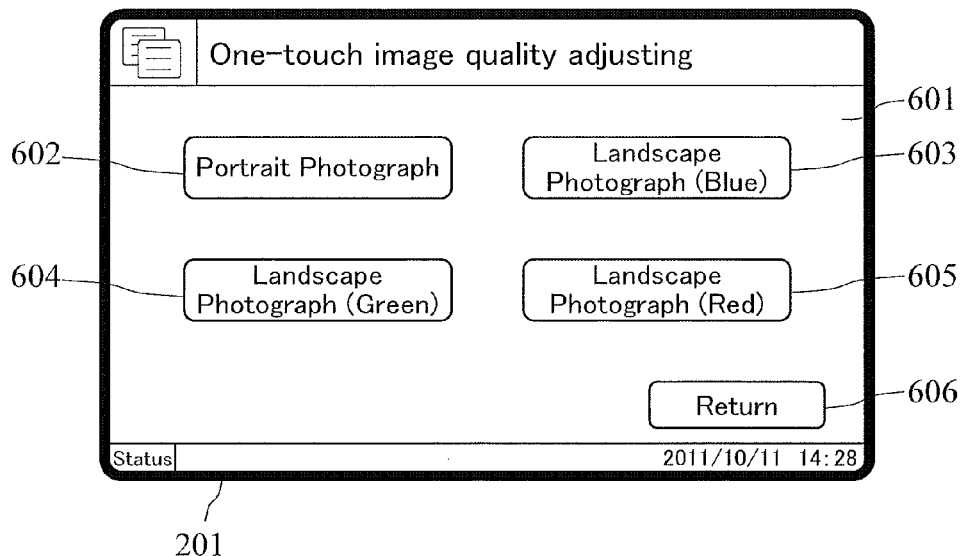
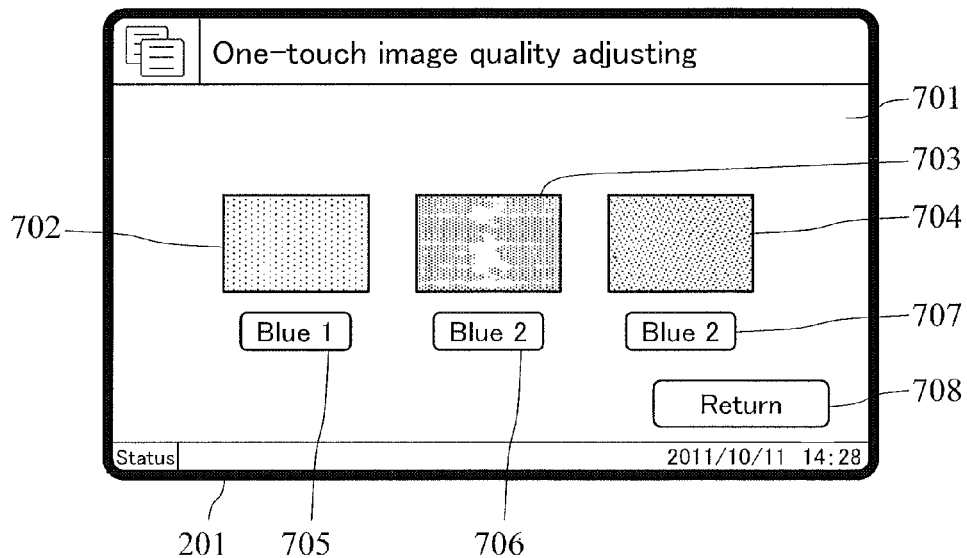

IMAGE PROCESSING APPARATUS

REFERENCE TO RELATED APPLICATIONS

This application is based upon and claims the benefit of priority from the corresponding Japanese Patent Application Nos. 2011-237078 and 2011-237079, respectively filed in the Japan Patent Office on Oct. 28, 2011 and Oct. 28, 2011, the entire contents of which are incorporated herein by reference.

BACKGROUND

The present disclosure relates to an image processing apparatus that conducts color correction on image data.

Devices capable of color printing are common among image forming apparatuses such as copying machines and multi-function peripherals (MFPs). This type of image forming apparatus implements color printing by combining printing by recording agents such as toner, ink or the like of the four colors of cyan (C), magenta (M), yellow (Y), and black (K), for example.

Many of such image forming apparatuses have a function that performs color correction on the image data. The reason for this is because, although faithfully reproducing the hue of the original document is demanded in image forming apparatuses, images that include pictures and the like are being printed in recent years, and thus there has come to be demand for the conversion of the hue to a color preferred by people. Converting the hue to a color preferred by people more specifically means to reproduce a so-called memory color. For example, memory color refers to a color such as the skin of a person, the blue of the sky, the green of vegetation, and the red of sunset, and is a color for which reproduction of the color, which is closer to that remembered by humans, is preferred over performing faithful reproduction of the color in the original document.

For such memory colors, there are individual differences in the preferred colors. For this reason, various techniques for adequately providing preferred colors in image forming apparatuses have been proposed.

For example, an image processing apparatus has been known that allows for a user to select their preferred color correction and that reflects the color correction in image processing, by printing color adjusted images consisting of a plurality of thumbnail images between which the color shade is varied slightly and allowing the user to input a number specifying a thumbnail image selected from among the printed color adjusted images.

In addition, a technology has been known that allows a user to select a color correction condition by displaying on the same screen a plurality of images generated by executing different color corrections on the same image, and allowing the user to select from these images.

With the aforementioned technology, so long as the preferred color correction is included among the suggested color correction candidates, the user will be able to easily select this color correction. However, in the case of the preferred color correct not being included among the suggested color correction candidates, complicated operation and the like will be necessary in order to obtain the preferred color correction, and the user will not be able to easily set the desired color correction.

SUMMARY

According to the present disclosure, an image processing apparatus that executes color correction on image data includes: a pixel extracting unit; target color storage unit; target color selection receiving unit; color correction executing unit; registration image storage unit; target color extracting unit and target color registration unit. The pixel extracting unit extracts a pixel belonging to a previously designated color range, from image data of a correction object. The target color storage unit stores a plurality of target colors to be associated with the previously designated color range. The target color selection receiving unit receives a selection of one target color by a user from among the plurality of target colors stored in the target color storage unit. The color correction executing unit executes color correction on the image data of the correction object, based on a color of a pixel extracted by the pixel extracting unit and a target color selected through the target color selection receiving unit. The registration image storage unit stores image data including a target color of a registration object. The target color extracting unit extracts the target color of the registration object from image data stored in the registration image storage unit. The target color registration unit registers the target color of the registration object extracted by the target color extracting unit in the target color storage unit to be associated with the previously designated color range.

Furthermore, according to the present disclosure, an image processing apparatus that executes color correction on image data includes: a pixel extracting unit; target color storage unit; target color selection receiving unit; color correction executing unit; registration image storage unit; target color extracting unit; color range input unit and target color registration unit. The pixel extracting unit extracts a pixel belonging to a previously designated color range, from image data of a correction object. The target color storage unit stores a plurality of target colors to be associated with the previously designated color range. The target color selection receiving unit receives a selection of one target color by a user from among the plurality of target colors stored in the target color storage unit. The color correction executing unit executes color correction on the image data of the correction object, based on a color of a pixel extracted by the pixel extracting unit and a target color selected through the target color selection receiving unit. The registration image storage unit stores image data including a target color of a registration object. The target color extracting unit extracts the target color of the registration object from image data stored in the registration image storage unit. A new color range associated with the target color of the registration object extracted by the target color extracting unit is input to the color range input unit. The target color registration unit registers the target color of the registration object extracted by the target color extracting unit in the target color storage unit to be associated with the new color range inputted to the color range input unit.

BRIEF DESCRIPTION OF DRAWINGS

FIG. 5 is a flowchart illustrating an example of a color correction procedure conducted by the MFP according to the first embodiment of the present disclosure;

FIG. 6 is a diagram illustrating an example of a color range selection screen displayed by the MFP according to the first embodiment of the present disclosure;

FIG. 7 is diagram illustrating an example of a target color selection screen displayed by the MFP according to the first embodiment of the present disclosure;

DETAILED DESCRIPTION

A first embodiment of the present disclosure will be explained hereinafter in further detail while referencing drawings. In the following, the present disclosure is embodied as a digital MFP.

Figure 1:
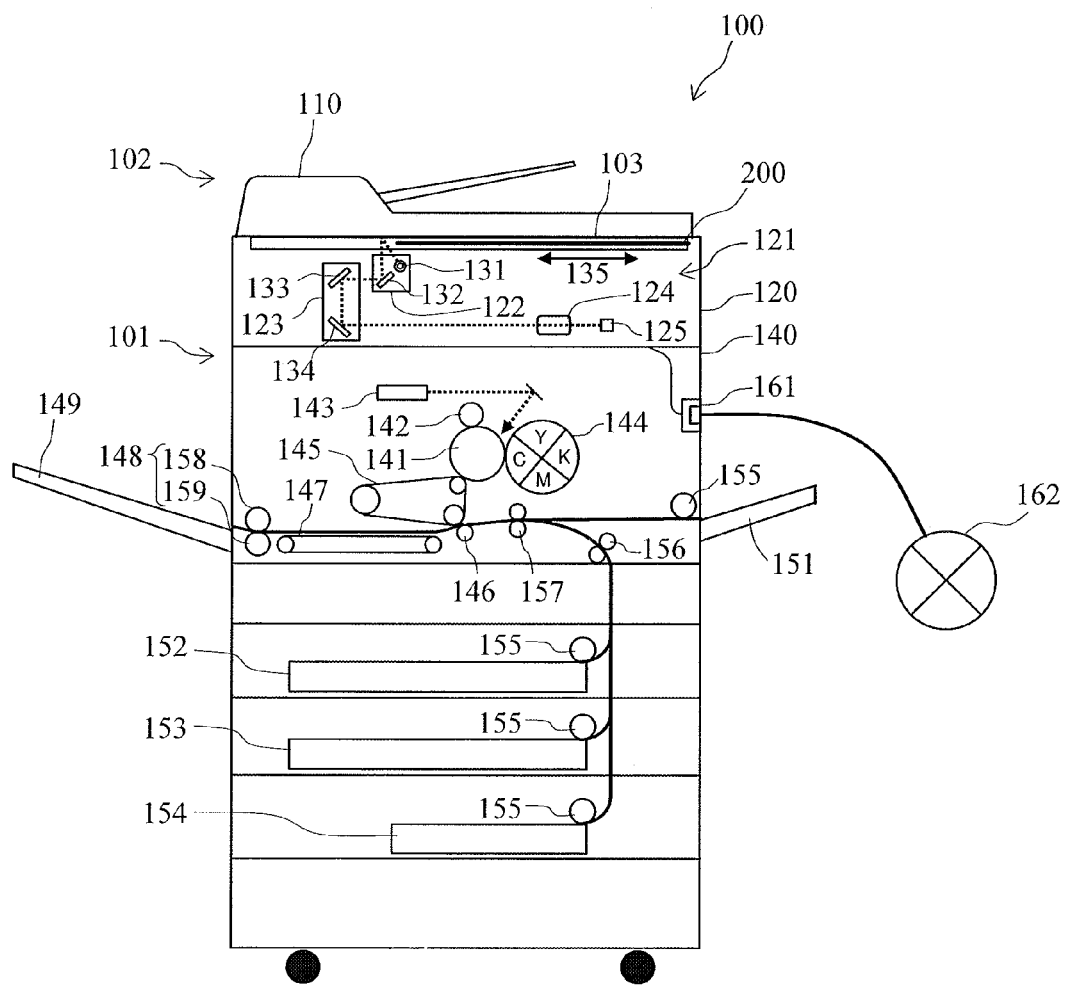
FIG. 1 is a schematic configuration diagram illustrating an overall configuration of an MFP according to a first embodiment of the present disclosure.

FIG. 1 is a schematic configuration diagram illustrating an example of an overall configuration of a digital MFP according to the first embodiment. As shown in FIG. 1, an MFP 100 includes a main body 101 having an image scanning unit 120 and an image forming unit 140, and a platen cover 102 mounted above the main body 101. A document table 103 is provided on the upper surface of the main body 101. The document table 103 is opened or closed by way of the platen cover 102. In addition, the platen cover 102 includes a document feeder 110.

The image scanning unit 120 is provided below the document table 103. The image scanning unit 120 scans an image of an original document by way of an optical scanning system 121, and generates digital data (image data) of this image. The original document is placed on the document table 103 or the document feeder 110. The optical scanning system 121 includes a first carriage 122, a second carriage 123 and a condensing lens 124. A linear light source 131 and a mirror 132 are provided to the first carriage 122. Mirrors 133 and 134 are provided to the second carriage 123. The light source 131 illuminates an original document. The mirrors 132, 133 and 134 lead reflected light from the original document to the condensing lens 124. The condensing lens 124 forms a light image on a light receiving surface of the line image sensor 125.

In the optical scanning system 121, the first carriage 122 and the second carriage 123 are provided to be able to advance and retract in the sub scanning direction 135. By moving the first carriage 122 and second carriage 123 in the sub scanning direction 135, it is possible to scan an image of the original document placed on the document table 103 by the image sensor 125. When the image of the original document set on the document feeder 110 is scanned, the image scanning unit 120 temporarily fixes the first carriage 122 and the second carriage 123 according to an image scanning position, and scans the image of the original document passing through the image scanning position by the image sensor 125. For example, the image sensor 125 generates image data of the original document corresponding to the colors of red (R), green (G), and blue (B) from the light image incident to the light receiving surface. The generated image data is printed on a sheet in the image forming unit 140. In addition, the generated image data can be transmitted to another device (not illustrated) through a network 162 by way of a network adapter 161.

The image forming unit 140 prints the image data obtained by the image scanning unit 120 or image data received from another device (not illustrated) connected to the network 162 on a sheet. The image forming unit 140 includes a photoreceptor drum 141. The photoreceptor drum 141 rotates at constant velocity in one direction. In order from an upstream side in the rotation direction, a charging unit 142, an exposing unit 143, a developing unit 144 and an intermediate transfer belt 145 are arranged around the photoreceptor drum 141. The charging unit 142 uniformly charges the surface of the photoreceptor drum 141. The exposing unit 143 irradiates the surface of the uniformly charged photoreceptor drum 141 with light according to the image data, and forms an electrostatic latent image on the photoreceptor drum 141. The developing unit 144 causes toner to adhere to this electrostatic latent image, and forms a toner image on the photoreceptor drum 141. The intermediate transfer belt 145 transfers the toner image on the photoreceptor drum 141 to the sheet. In a case of the image data being a color image, the intermediate transfer belt 145 transfers toner images of each color to the same sheet. It should be noted that a color image of the RGB format is converted into image data of the CMYK format (cyan (C), magenta (M), yellow (Y), and black (K)), and image data of the respective colors is input to the exposing unit 143.

The image forming unit 140 feeds the sheet to a transfer unit between the intermediate transfer belt 145 and the transfer roller 146 from a bypass tray 151, paper cassettes 152, 153, and 154, or the like. Sheets of various sizes are stacked or received on the bypass tray 151 or each of the paper cassettes 152, 153, and 154. The image forming unit 140 selects a sheet designated by a user or a sheet according to an automatically detected size of an original document, and feeds the selected sheet from the bypass tray 151 or the paper cassettes 152, 153, and 154 by way of the feeding roller 155. The fed sheet is conveyed to the transfer unit by way of a conveyance roller 156 and a registration roller 157. The sheet to which the toner image has been transferred is conveyed to a fusing unit 148 by way of a conveying belt 147. The fusing unit 148 includes a fuser roller 158 having a heater built therein and a pressure roller 159, and fuses the toner image to the sheet by way of heat and pressing force. The image forming unit 140 discharges the sheet having passed through the fusing unit 148 to a discharge tray 149.

Figure 2:
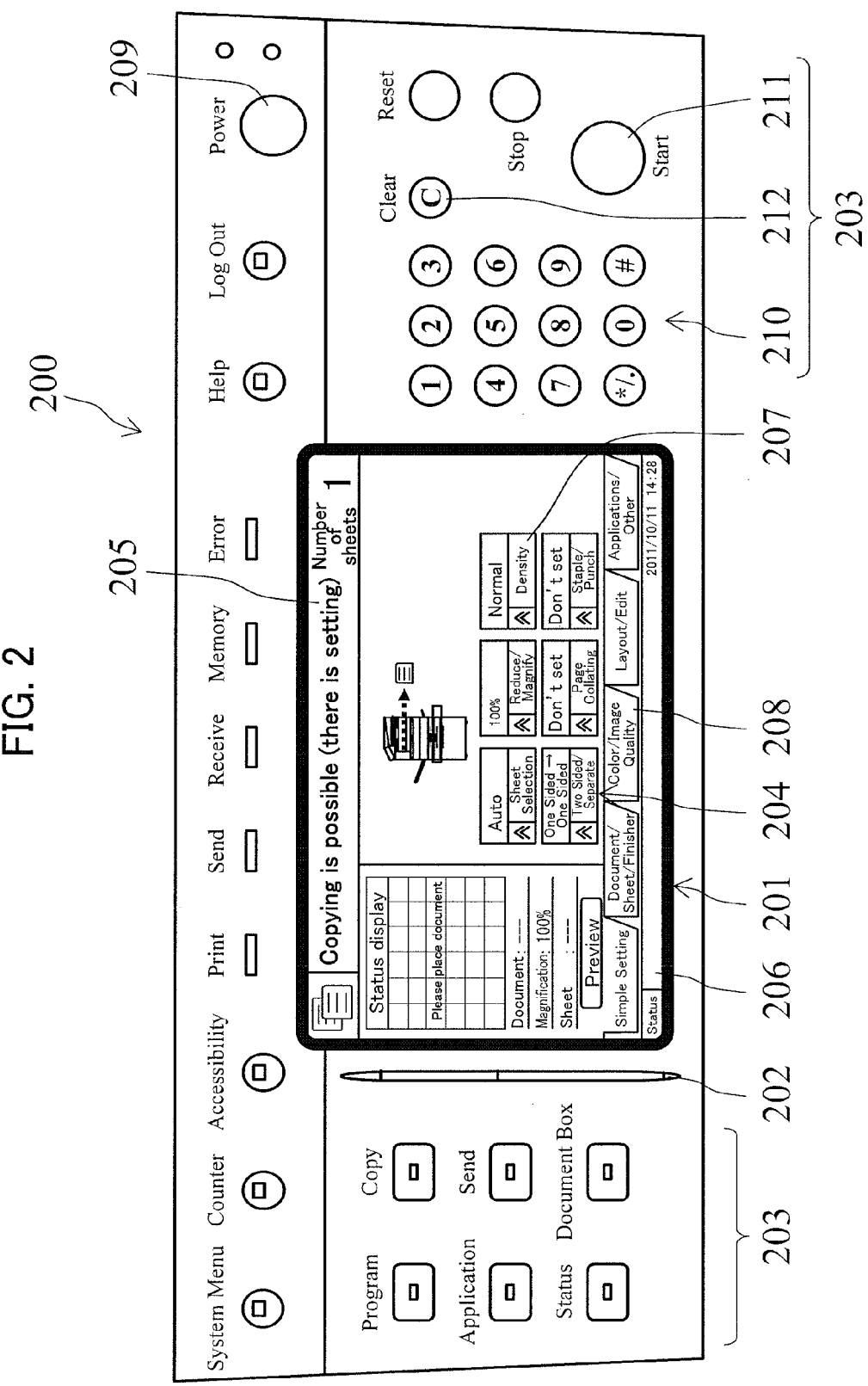
FIG. 2 is a schematic diagram illustrating an operating panel of the MFP according to the first embodiment of the present disclosure.

FIG. 2 is a diagram illustrating an example of an external appearance of an operating panel included in the MFP. The user can give an instruction for starting a copying operation and other instructions to the MFP 100, and check the status and settings of the MFP 100 using the operating panel 200. A touch screen (display with a touch panel) 201 and operating keys 203 are arranged at the operating panel 200. The touch screen 201 includes a display surface, configured with a liquid crystal display or the like, which displays operating buttons, messages, and the like, and a sensor that detects a pressing position on the display surface. The method of detecting the pressing position is not particularly limited, and any type such as a resistive type, a capacitive type, a surface acoustic wave (SAW) type, and an electromagnetic wave type may be employed. The user can perform input through the touch screen 201 using his/her finger or a touch pen 202.

The touch screen 201 displays an operation screen including a button display portion 204, a message display portion 205, and a status display portion 206. A plurality of tabs 208 is arranged in the button display portion 204. Operating buttons corresponding to the category of the tab are arranged at each tab. A "simple setting" tab includes operating buttons used for basic setting. In the example of FIG. 2, operating buttons for setting a sheet size, copying magnification, density, a print side, page collating, and post processing are arranged. For example, when the user performs an operation of pressing a "density" button 207, a pop-up screen including selecting buttons for selecting the density such as "fine", "normal", and "thick" is displayed over the operating button thereof in a superimposed manner. The density is set by the user's selection (pressing). In the example of FIG. 2, a "document/sheet/finisher" tab, a "color/image quality" tab, a "layout/edit" tab, and a "applications/other" tab are also provided in addition to the "simple setting" tab. The user can change to the display of these tabs by performing an operation of selecting the tab 208. In a state in which one tab is selected, the other tabs or elements thereof are hidden on the operation screen. It should be noted that, with the MFP 100, color correction, which will be described later, may be executed by pressing a "one touch image quality adjusting" button included in the "color/image quality" tab. In addition, target color registration, which will be described later, may be executed by pressing a "target color registering" button included in the "color/image quality" tab.

A message for notifying the user of settings, such as whether or not a copying operation can be performed and the number of sheets to copy, is displayed on the message display portion 205. In addition, apparatus status information is displayed on the status display portion 206 as necessary. Detection results of various sensors included in the MFP 100 are reflected on this display. Apparatus status information refers to a message for notifying the user of an alert for prompting a response to an abnormality, despite the apparatus being in an operable state. Apparatus status information, for example, includes information representing that the number of remaining sheets is small, information representing that the document table 103 is dirty, and information representing that a facsimile document is stored in memory when a facsimile memory reception is set. In addition, the apparatus status information may include out of paper information, conveying jam information, and the like.

The operating keys 203 include a main power key 209, a numeric keypad 210, a start key 211, a clear key 212, and the like. For example, the power key 209 is used to turn the MFP 100 on and off. The numeric keypad 210 may be used for designating the number of sheets to copy or for setting the copying magnification. When the user makes these settings, the MFP 100 displays a message like "copying is possible (there is setting)" on the message display portion 205, and thus notifies that setting has been made by the user. The start key 211 is used to give an instruction for starting a copying operation or an image printing operation. The user operates the clear key 212 when releasing setting made by himself/herself. Since it can be determined based on the above described message whether or not a machine has accepted settings made by the user, when the setting becomes unnecessary, the user may operate the clear key 212.

Figure 3:
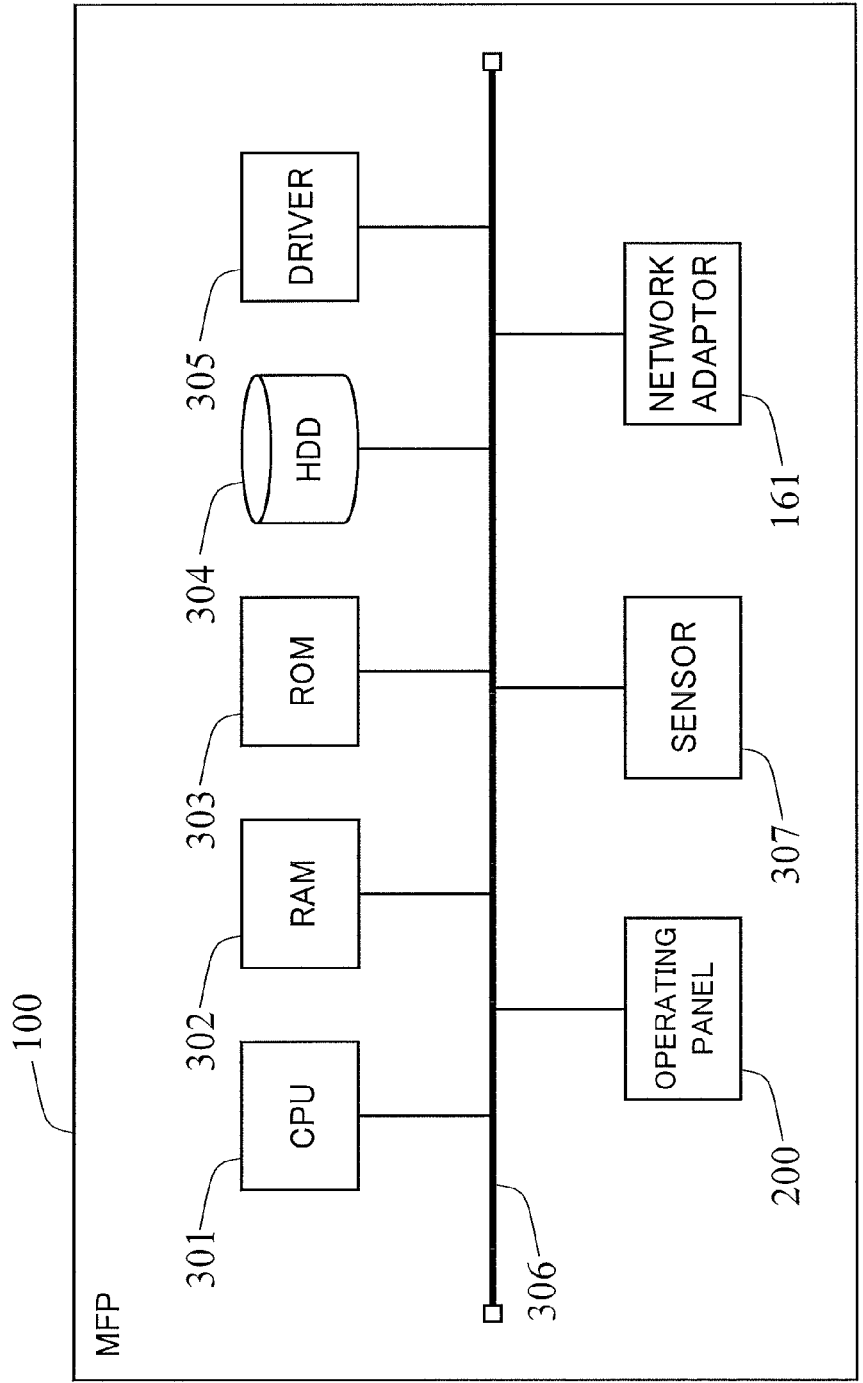
FIG. 3 is a diagram illustrating a hardware configuration of the MFP according to the first embodiment of the present disclosure.

FIG. 3 is a hardware configuration view of a control system in an MFP. In the MPF 100 of the first embodiment, a central processing unit (CPU) 301, random access memory (RAM) 302, read only memory (ROM) 303, a hard disk drive (HDD) 304, and a driver 305 are connected via an internal bus 306. The driver 305 supports driving units in the document feeder 110, the image scanning unit 120, and the image forming unit 140. The ROM 303, the HDD 304, or the like store a program. The CPU 301 controls the MFP 100 according to a command of the control program. For example, the CPU 301 uses the RAM 302 as a working area, and transfers data or commands with the driver 305 to control the operation of each driving unit. The HDD 304 is also used to accumulate image data obtained from the image scanning unit 120 and image data received from another apparatus via the network adapter 161.

The operating panel 200 and various sensors 307 are also connected to the internal bus 306. The operating panel 200 receives the user's operation and supplies the CPU 301 with a signal based on the operation. The touch screen 201 displays the aforementioned operation screen according to a control signal from the CPU 301. The sensors 307 include various sensors such as a sensor for detecting an open or close state of the platen cover 102, a sensor for detecting an original document set on the document table 103, a sensor for detecting the temperature of the fusing unit 148, and a sensor for detecting a conveyed sheet or original document. For example, by executing a program stored in the ROM 303, the CPU 301 implements the following means (functional blocks) and controls operations of the means according to signals from the sensors.

Figure 4:
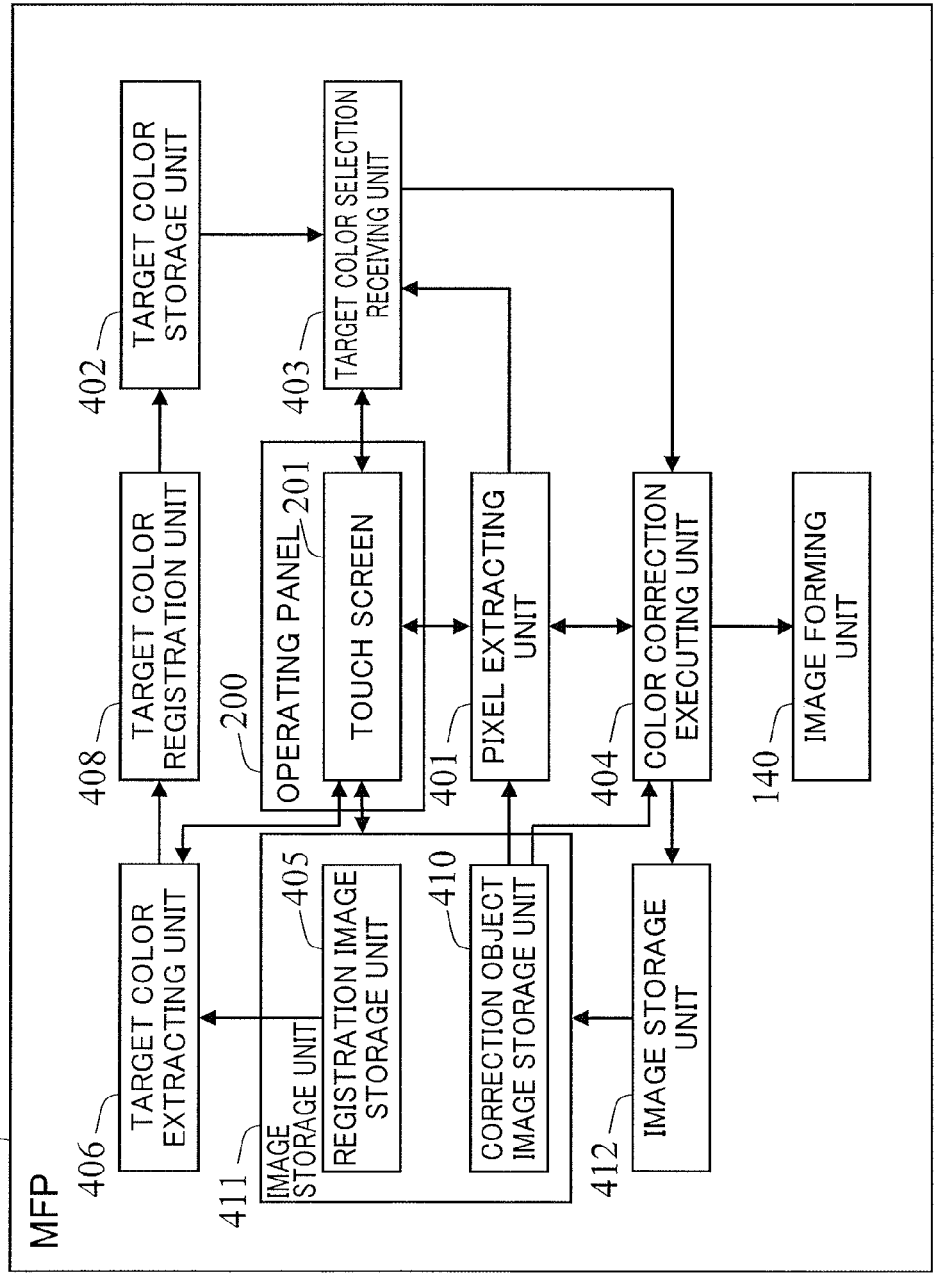
FIG. 4 is a functional block diagram illustrating the MFP according to the first embodiment of the present disclosure.

FIG. 4 is a functional block diagram of the MFP of the first embodiment. As illustrated in FIG. 4, the MFP 100 of the first embodiment includes a pixel extracting unit 401, a target color selection storage unit 402, a target color selection receiving unit 403, a color correction executing unit 404, a registration image storage unit 405, a target color extracting unit 406, a target color registration unit 408 and a correction object image storage unit 410. The pixel extracting unit 401, target color storage unit 402, target color selection receiving unit 403, color correction executing unit 404 and correction object image storage unit 410 realize functions to conduct color correction, on the image data in the MFP 100, to approximate the color of pixels belonging to a predetermined color range to a target color. In addition, the registration image storage unit 405, target color extracting unit 406 and target color registration unit 408 realize functions to register a new target color in the target color storage unit 402 in the MFP 100.

The pixel extracting unit 401 extracts pixels belonging to a color range designated in advance (hereinafter referred to also as designated color range) from the image data of a correction object. For example, the color range can be set as a color occupying a certain area in the CIE L*C*h color space that refers to a uniform color space. Here, the image data includes color information expressed by a color component configuring an absolute color space such as standard RGB (sRGB), and can be easily converted into an expression in the CIE L*C*h color space. In a case of the image data including color information expressed by a device-dependent RGB format, the MFP 100 converts the color information into color information expressed by the absolute color space.

Although not particularly limited, in the first embodiment, the correction object image data is temporarily stored in the correction object image storage unit 410. Here, the correction object image storage unit 410 is configured as a region of an image storage unit 411 composed of volatile memory such as RAM in which correction object image data is saved. It should be noted that, in the first embodiment, the registration image storage unit 405 described later is also provided to the image storage unit 411. The registration image storage unit 405 is configured as a region of the image storage unit 411 in which image data containing the target color of a registration object is saved (hereinafter referred to as target color registration image data). In a case of not simultaneously storing the correction object image data and the target color registration image data, it is possible to configure the correction object image storage unit 410 and the registration image storage unit 405 as the same part of the image storage unit 411.

It should be noted that the image data stored in the image storage unit 411 (correction object image data or target color registration image data) is acquired from the image storage unit 412. The image storage unit 412 is a storage region reserved in the aforementioned HDD 304. The image data inputted from the image scanning unit 120 and the image data inputted from an external device through the network adapter 161 or the like are saved in the image storage unit 412. In addition, it may be a configuration in which the image data inputted from the image scanning unit 120 and image data input from an external device through the network adapter 161 or the like are directly saved in the image storage unit 411.

The target color storage unit 402 saves color information of the target color for color correction conducted by the color correction executing unit 404 described in detail below. Here, color coordinates in CIE L*C*h color space are saved as the color information. In the target color storage unit 402, the target color is saved to be associated with a color range that can be selected as the aforementioned designated color range. A plurality of target colors are associated to one color range. The user can select a target color for color correction by way of the color correction executing unit 404, by selecting one target color from among the plurality of target colors. This one target color is selected by the user through the target color selection receiving unit 403.

The color correction executing unit 404 executes color correction on correction object image data stored by the correction object image storage unit 410, based on the color of a pixel extracted by the pixel extracting unit 401 and the target color selected through the target color section receiving unit 403. In the color correction, if it is assumed that all pixels extracted by the pixel extracting unit 401 are replaced with the selected target color, tone jump will occur, and the image quality will decline remarkably. For this reason, the color correction executing unit 404 prevents the occurrence of the tone jump by calculating the color difference between the color of the pixel extracted by the pixel extracting unit 401 and the selected target color. The color difference corresponds to the color correction quantity corresponding to a distance between the two colors in the uniform color space (or the uniform color plane). In this correction technique, correction of approximating the color of the pixel extracted by the pixel extracting unit 401 to the target color can be implemented.

Specifically, when the color difference is large, a correction quantity in a direction toward the target color (hereinafter, referred to as "color correction vector") is increased, whereas when the color difference is small, the color correction vector is decreased. Although not particularly limited, in the first embodiment, one correction parameter is selected, for example, from among correction parameters a1, a2, a3, a4, and a5 of five steps (a1<a2<a3<a4<a5), according to the magnitude of the color difference, and the size of the color correction vector is calculated by a product of the color difference and the selected correction parameter. In this case, the correction parameter is set as a value between 0 and 1. In the first embodiment, the target color is set as one dot in the CIE L*C*h color space, as stated above. Therefore, the color correction vector directed toward the target color in the CIE L*C*h color space is calculated as the color correction quantity.

The color correction executing unit 404 first calculates the color correction quantity corresponding to the selected target color by way of the aforementioned technique from the image data stored in the corrected target image storage unit 410 for each pixel extracted by way of the pixel extracting unit 401 as a pixel belonging to the above-mentioned designated color range. Next, the color correction executing unit 404 changes the color information of each extracted pixel by applying the calculated color correction quantity to the color information of each pixel extracted by the pixel extracting unit 401. It should be noted that application of the color correction quantity is executed based on the color coordinates in CIE L*C*h space, as mentioned above. The color correction executing unit 404 obtains corrected image data by changing to the color information expressed by the color components constituting the absolute color space such as sRGB after application of the color correction quantity.

Next, the configuration exerting a function of registering new target colors in the target color storage unit 402 will be explained. As mentioned above, the function of registering a new target color is realized by the registration image storage unit 405, target color extracting unit 406 and target color registration unit 408.

The target color extracting unit 406 extracts a target color of a registration target from the image data for target color registration stored in the image for registration storage unit 405. As the target color registration image data, the image data saved in the image storage unit 412, image data inputted from the image scanning unit 120, and image data inputted from an external device through the network adapter 161 or the like can be used.

The extraction of a new target color can be executed by designation of a position (point or region) in the target color registration image data by the user, for example. In other words, in a case of only a single color existing at the position designated by the user in the target color registration image data, the image color extracting unit 406 extracts the color as a new target color. In addition, in a case of a plurality of colors existing at the position designated by the user in the target color registration image data, the target color extracting unit 406 suggests the plurality of colors as target color candidates to the user, and the user designated a color to extract as a new target color from among the suggested target color candidates. Alternatively, the target color extracting unit 406 may count the number of pixels for each of these target color candidates, and extract a color having the largest number of pixels as the new target color automatically. It should be noted that even in the case of suggesting the extracted target color candidates to the user, there is no requirement to suggest all thereof, and it is possible to establish a configuration that suggests a portion (e.g., on the order of 3) in order of having a larger number of pixels.

In addition, as mentioned above, with the target color storage unit 402, the target color is stored to be associated with a color range, and a new target color must also be stored to be associated with a color range. As a result, in a case of a color range associated with the new target color being previously designated, the target color extracting unit 406 may extract a color belonging to the color range, from all of the target color registration image data, a position previously designated in the target color registration image data, or a position designated by the user in the target color registration image data. In this case, since a plurality of colors will normally be extracted, it is sufficient to configure so as to decide one new target color as mentioned above.

The target color registration unit 408 registers a target color of a registration object extracted by the target color extracting unit 406 in the target color storage unit 402 to be associated with a color range.

It should be noted that, with the MFP 100, commands such as selections by the user are input by way of an operation on the operating panel 200 including the touch screen 201 (pressing of the operating keys 203 and pressing of the touch screen 201). The touch screen 201 recognizes the user's operation contents based on the coordinates of a pressing position detected by a sensor detecting the pressing position on the touch screen 201 and the coordinates of a screen element such as an operating button displayed on the touch screen 201.

Next, processes executed by the MFP 100 will be explained. Hereinafter, a process of color correction will first be explained, followed by a registration procedure of a target color being explained.

FIG. 5 is a flowchart illustrating an example of a color correction process executed by the MFP 100. For example, the process starts using the event of a color correction instruction being inputted by the user as a trigger. As described above, the color correction instruction is input to the MFP 100 when the user presses the "one touch image quality adjusting" button included in the "color/image quality" tab of the operation screen.

At this time, the pixel extracting unit 401 displays a screen requesting designation of image data on the touch screen 201 and is in standby until image data is designated by the user (Step S501: NO). The user designates image data to be a color correction object. The designation method is not particularly limited. For example, in a case of image data stored in the image storage unit 412 being designated as the image data of the color correction object, it is sufficient if a list of image data stored in the image storage unit 412 is displayed on the touch screen 201, and image data read from the list is selected. The selected image data is read from the image storage unit 412 and stored in the correction object image storage unit 410. The correction object image data may be scanned by the image scanning unit 120. In this case, the user sets an original document of the color correction object on a document tray of the document feeder 110 and instructs the MFP 100 to start a scanning operation by pressing the start key or the like. The image data scanned by the image scanning unit 120 is stored in the correction object image storage unit 410. When the same color correction is applied, image data having a plurality of pages may be stored in the correction object image storage unit 410. Here, this explanation is based on an example in which the image data is one page.

When designation of the image data is completed, the pixel extracting unit 401 displays a screen requesting selection of a color range to be the object of color correction in the correction object image data (designated color range) on the touch screen 201, and is in standby until the color range is selected by the user (Step S501: YES; Step S502: NO). The user selects a color to be a correction object.

FIG. 6 is a diagram illustrating an example of a color range selection screen displayed on the touch screen 201 at this time. In this example, a color range selection screen 601 includes selecting buttons 602 to 605 used in the selection of a color range, and a "return" button 606. The "return" button 606 is used for interrupting a selection operation and returning to the designation of image data. FIG. 6 illustrates an example in which a "portrait photograph" button 602 corresponding to a flesh color, which is one memory color, a "landscape photograph (blue)" button 603 corresponding to a blue color, which is one memory color, a "landscape photograph (green)" button 604 corresponding to a green color, which is one memory color, and a "landscape photograph (red)" button 605 corresponding to a red color, which is one memory color, are arranged as examples of the selecting buttons. When the user selects one button from among the selecting buttons 602 to 605, the pixel extracting unit 401 sets a color range associated with the selected button (memory color) as a designated color range used for pixel extraction.

For example, in FIG. 6, when the user selects the "landscape photograph (blue)" button 603, the pixel extracting unit 401 is set to a state for extracting pixels of colors belonging to a color range of blue (L*: 20 to 80, C*: 5 to 55, Hue: 190 to 330°) associated with the selected button. The color ranges are registered in advance in the pixel extracting unit 401 in association with the selecting buttons 602 to 605 in advance.

The pixel extracting unit 401 having received designation of a color range notifies the target color selection receiving unit 403 of information indicating the color range (hereinafter referred to as color range identifier). The target color selection receiving unit 403 having receiving the notification displays a screen to receive selection of a target color by the user on the touch screen 201, and is in standby until the user selects a target color (Step S502: YES; Steps S503 and S504: NO). The target color selection receiving unit 403 displays each target color registered in the target color storage unit 402 to be associated with the notified color range on the screen.

FIG. 7 is a diagram illustrating an example of a target color selection screen displayed on the touch screen 201 at this time. In this example, the target color selection screen 701 includes rectangular images 702 to 704 colored in each target color. In this diagram, the rectangular image 702 corresponds to a first target color (hereinafter referred to as "blue 1"), the rectangular image 703 corresponds to a second target color (hereinafter referred to as "blue 2"), and the rectangular image 704 corresponds to a third target color (hereinafter referred to as "blue 3"). In addition, the target color selection screen 701 includes a "blue 1" button 705, a "blue 2" button 706 and a "blue 3" button 707 used for selecting the target color corresponding to the respective rectangular images, and a "return" button 708. The "return" button 708 is used for interrupting a selection operation and returning to the color range selection screen 601.

For example, the first target color can be defined as a vivid blue color, the second target color defined as a deep blue color without green, and the third target color defined as a blue color with green (so-called emerald green). Here, a description is briefly made in connection with the other selecting buttons in the color range selection screen 601, the "portrait photograph" button 602 can be associated with a target color which is adjusted in a direction of a flesh color of a ruddy impression having red, a target color which is adjusted in a direction of a flesh color of a suntanned impression, and a target color which is adjusted in a direction of a fair flesh color. The "landscape photograph (green)" button 604 can be associated with a target color which is adjusted in a direction of vivid green, a target color which is adjusted in a direction of yellow green, and a target color which is adjusted in a direction of slightly bluish green. Furthermore, the "landscape photograph (red)" button 605 can be associated with a target color which is adjusted in a direction of vivid red, a target color which is adjusted in a direction of an orange color, and a target color which is adjusted in a direction of pink.

When the user selects any one of the "blue 1" button 705, the "blue 2" button 706, and the "blue 3" button 707 in the target color selection screen 701 illustrated in FIG. 7, the target color selection receiving unit 403 inputs color information of the selected target color to the color correction executing unit 404 (Step S504: YES). For example, in FIG. 7, when the user selects the "blue 2" button 706, the target color selection receiving unit 403 inputs the color information of the target color "blue 2" to the color correction executing unit 404.

The color correction executing unit 404 to which the color information of the target color has been input notifies the pixel extracting unit 401 of the start of color correction. The pixel extracting unit 401 having received the notice extracts pixels having colors belonging to the designated color range from the image data stored in the correction object image storage unit 410. The pixel extracting unit 401 inputs the color information of the extracted pixels and the positional information in the image data of these pixels to the color correction executing unit 404. The color correction executing unit 404 having received the input calculates a color correction quantity for each pixel extracted by the aforementioned technique, based on the color information of the target color and the color information inputted from the pixel extracting unit 401, and obtains corrected color information for each extracted pixel. The color correction executing unit 404 executes color correction by acquiring image data stored in the correction object image storage unit 410 and converting the color of a pixel corresponding to the positional information inputted from the pixel extracting unit 401 to the corrected color (Step S505).

The color-corrected image data generated by the color correction executing unit 404 in the above described manner is output from the color correction executing unit 404 such that the color-corrected image data is printed by the image forming unit 140 or stored in the image storage unit 412.

Figure 8:
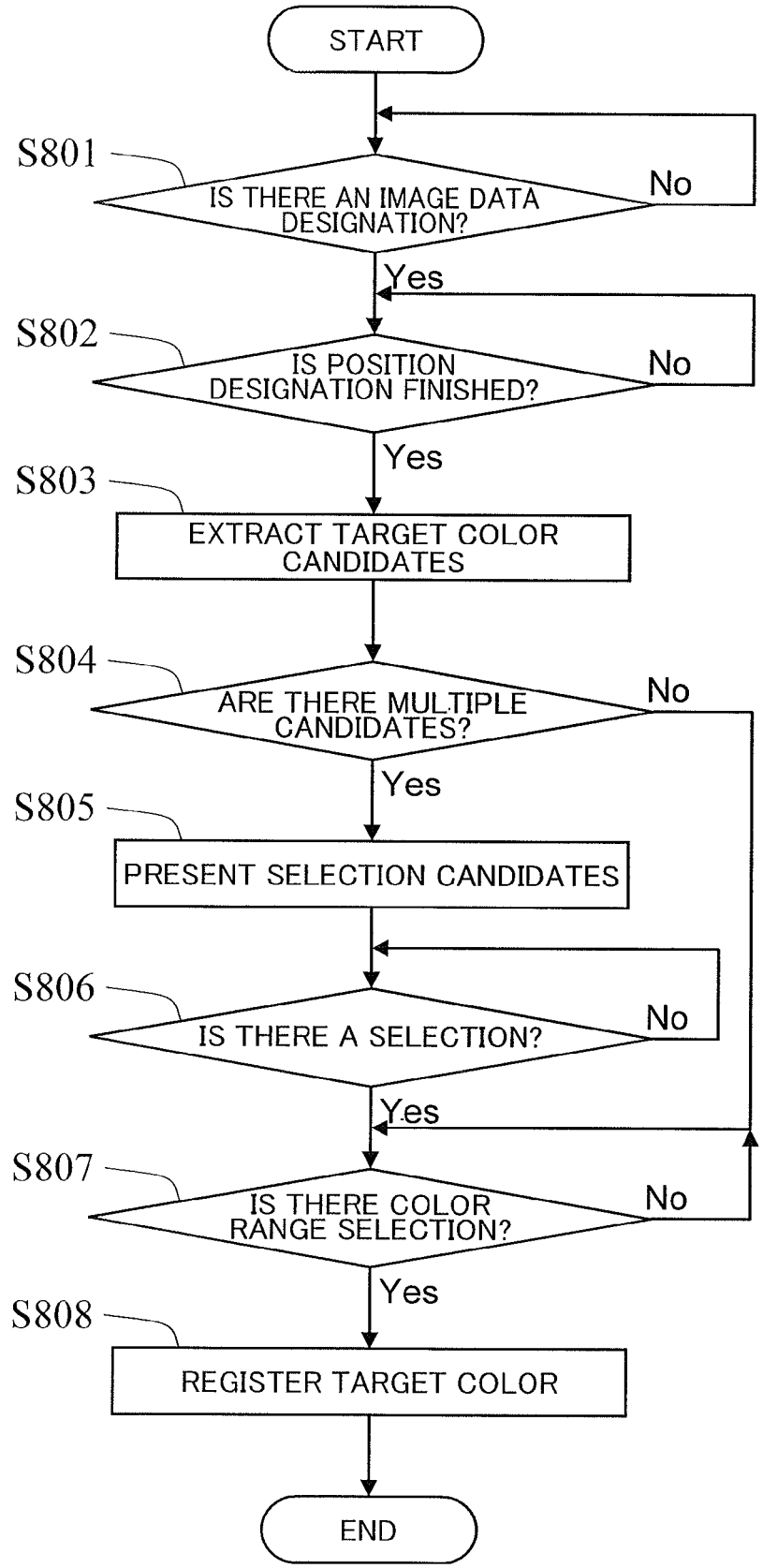
FIG. 8 is a flowchart illustrating an example of a target color registration procedure conducted by the MFP according to the first embodiment of the present disclosure.

Next, a process for registration of a target color executed by the MFP 100 will be explained. FIG. 8 is a flowchart illustrating an example of a target color registration process executed by the MFP 100. Here, an example of registering the target color in "landscape photography (blue)" will be explained. This process advances with an event of a target color registration instruction by the user having been input as a trigger, for example. It should be noted that the target color registration instruction is input to the MFP 100 by the user pressing the "target color registration" button included on the "color/image quality" tab of the operation screen, as described above.

At this time, the target color extracting unit 406 displays a screen requesting an image data designation on the touch screen 201, and is in standby until the user designates image data (Step S801: NO). The user designates target color registration image data including the target color in the image. The designation method is not particularly limited. For example, in a case of designating image data saved in the image storage unit 412 as the target color registration image data, it is sufficient to display a list of image data saved in the image storage unit 412 on the touch screen 201, and to select image data read from the list. The selected image data is read from the image storage unit 412 and stored in the registration image storage unit 405. In this example, the image data of an image showing the ocean during the daytime is used as the target color registration image data. This image includes a blue sky, clouds and the ocean. The target color registration image data may be scanned by the image scanning unit 120. In this case, the user sets an original document of the registration object on a document tray of the document feeder 110 and instructs the MFP 100 to start a scanning operation by pressing the start key or the like. The image data scanned by the image scanning unit 120 is stored in the registration image storage unit 405.

When designation of the image data completes, the target color extracting unit 406 displays a screen requesting designation of a position (point or region) at which the target color to be registered is present in the target color registration image data on the touch screen 201, and is in standby until the user selected a position (Step S801: YES; Step S802: NO). The user designates the position at which the target color to be registered is present.

Figure 9:
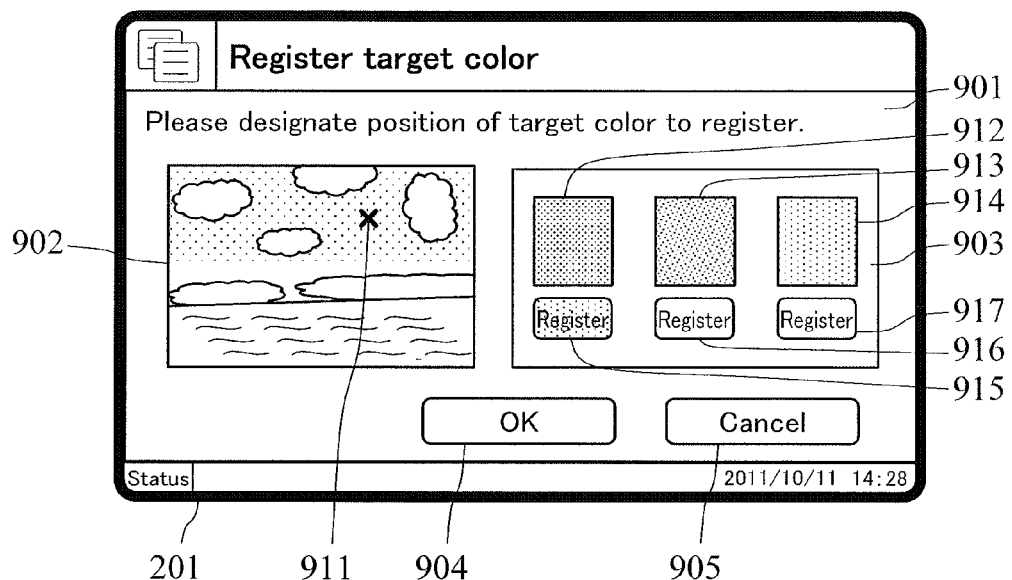
FIG. 9 is a diagram illustrating an example of a target color position designation screen displayed by the MFP according to the first embodiment of the present disclosure.

FIG. 9 is a diagram illustrating an example of a target color position designation screen displayed on the touch screen 201 at this time. In this example, a target color position designation screen 901 includes a preview display portion 902 displaying the aforementioned target color registration image data, target color selection portion 903, "OK" button 904 and "cancel" button 905. The target color selection portion 903 displays target color candidates extracted in accordance with the position designation by the user, as well as receiving a selection by the user. The "OK" button 904 is selected upon fixing the selection of the user at the target color selection portion 903. The "cancel" button 905 is used upon interrupting selection and returning to the immediately prior operation screen (here, the designation screen of target color registration image data). It should be noted that, although not particularly limited, here, a thumbnail image in which the number of pixels for the target image registration image data designated as described above is reduced to a size appropriate to display is displayed on the preview display part 902. Here, the thumbnail image is generated by the target color extracting unit 406.

On the target color position designation screen 901, the user uses their finger or a touch pen 202 to designate the position in the target color registration image data displayed in the preview display portion 902 at which a target color desired to be registered is present (Step S802: YES). Here, the user has designated a point 911 (a portion of the blue sky in the image) shown in FIG. 9. In response to the designation, the target color extracting unit 406 extracts the color information of the pixel present at the point (or region including the point) in the target color registration image data corresponding to the point 911 designated by the user in the thumbnail image displayed on the preview display part 902 (Step S803). This color information is a target color candidate. It should be noted that the color information may be one color or may be a plurality of colors, as described above. Here, the target color extracting unit 406 extracts a plurality of target color candidates, and specifies, from among the plurality of target color candidates, the target color candidates of three colors in order of larger number of pixels.

The target color extracting unit 406 specifying a plurality of target color candidates corresponding to the designated position of the user displays these specified target color candidates on the target color selection portion 903 of the target color position designation screen 901, and is in standby under the users makes a selection (Step S804: YES; Steps S805, S806: NO). As shown in FIG. 9, the target color selection portion 903 includes rectangular images 912 to 914 colored by the respective target color candidates, and "registration" buttons 915 to 917 used in selection of the target colors corresponding to the respective rectangular images. This example shows a situation in which the "registration" button 915 corresponding to the target color candidate 912 being displayed on the left side in the target color selection portion 903 has been selected.

Figure 10:
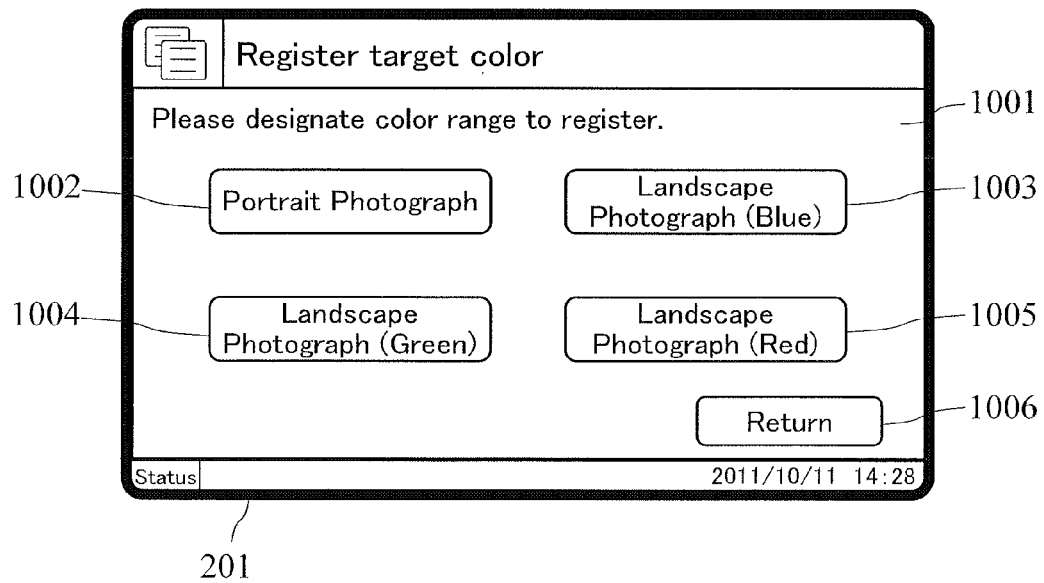
FIG. 10 is a diagram showing an example of a color range designation screen displayed by the MFP according to the first embodiment of the present disclosure.

When the user selects the "OK" button 904 in the situation, the target color extracting unit 406 requests the user for designation of the color range associated with the selected target color (Step S806: YES; Step S807: NO). FIG. 10 is a diagram illustrating an example of a color range designation screen displayed on the touch screen 201 at this time. In this example, a color range designation screen 1001 includes selecting buttons 1002 to 1005 used in the selection of a color range, and a "return" button 1006. The "return" button 1006 is used in order to interrupt selection and return to the target color position designation screen 901. Similarly to the aforementioned color range selection screen 601, FIG. 10 includes as selecting buttons a "portrait photograph" button 1002 corresponding to a flesh color, a "landscape photograph (blue)" button 1003 corresponding to a blue color, a "landscape photograph (green)" button 1004 corresponding to a green color, and a "landscape photograph (red)" button 1005 corresponding to a red color.

When the user selects one button from the selecting buttons 1002 to 1005, the target color extracting unit 406 inputs the target color, for which the color range corresponding to the selected button has been previously selected, to the target color registration unit 408 (Step S807: YES). The target color registration unit 408 having received the input registers color information of the inputted target color in the target color storage unit 402 to be associated with the inputted color range (Step S808). In the aforementioned example, due to extracting the color of the blue sky in the target color registration image data, the user selects the "landscape photograph (blue)" button 1003 in the color range designation screen 1001. As a result thereof, the color information of the target color candidate selected by the user on the target color selection portion 903 of the target color position designation screen 901 is registered in the target color storage unit 402 to be associated with the color range of blue.

Figure 11:
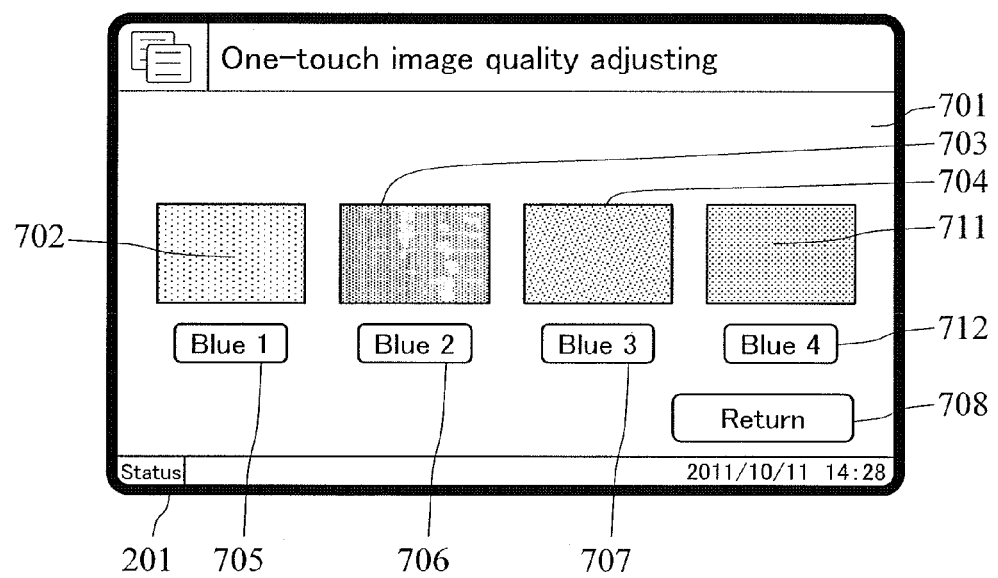
FIG. 11 is a diagram illustrating an example of a target color selection screen displayed by the MFP according to the first embodiment of the present disclosure.

FIG. 11 is a diagram illustrating a target color selection screen 701 displayed when the user selects a target color upon color correction execution, after a new target color has been registered in the target color storage unit 402 as described above. As shown in FIG. 11, the rectangular image 711 colored by the new target color is added to the target color selection screen 701 as a fourth target color (hereinafter referred to as "blue 4"), and a "blue 4" button 712 used in the selection of the target color corresponding to the rectangular image 711 is added. Therefore, it becomes possible for the user to select the registered new target color "blue 4" in subsequent color correction.

It should be noted that, although not particularly limited, in the first embodiment, in a case of the target color candidate extracted by the target color extracting unit 406 in the aforementioned extracting step of target color candidates according to the position designation by the user (Step S804) being one color, the target color extracting unit 406 does not request the user for selection of a target color candidate, but rather requests designation of a color range (Step S804: NO; Step S807). In addition, in a case of the target color candidate extracted by the target color extracting unit 406 in the extracting step (Step S804) being one color, it is also possible to make a configuration in which the target color registration unit 408 specifies a color range to which the target color candidate belongs, and register the target color candidate in the target color storage unit 402 to be associated with the specified color range.

It should be noted that the ranges of colors corresponding to the memory colors such as flesh color, blue, green and red can be respectively set in the above-mentioned color ranges, for example.

To summarize, in this image processing apparatus, the target color extracting unit is a configuration that extracts a pixel in a previously designated region of image data, displays the color of the extracted pixel as a candidate of a registration object target color, and receives selection of a registration object target color by the user. It should be noted that, with this configuration, the target color extracting unit may extract only pixels belonging to the previously designated color range.

As explained in the foregoing, this MFP 100 registers a target color using the image data itself; therefore, the user can register a color included in an image confirmed by sight as the target color. For this reason, a preferred color by the user, such as a memory color, can be very easily and reliably registered as a target color. As a result, upon executing color correction, the user can easily conduct color correction to the preferred color.

In addition, with the MFP 100, in a case of a plurality of colors being included in the image data for target color registration, the user can select a desired target color from the suggested candidates of the target color. In other words, the preferred color of the user can be very easily and reliably registered as a target color.

It should be noted that a configuration in which the target color extracting unit 406 designates the color range after the user has selected a target color candidate has been explained in the foregoing. However, designation of the color range by the user can be conducted prior to the designation of image data, or prior to position designation in the target color registration image data. In this case, it is more preferable for the target color extracting unit 406 to extract only the color information belonging to the designated color range. With this configuration, it is possible to prevent color information for which registering as the target color of the designated color range is not appropriate from being extracted as a target color candidate. In addition, the color information extracted as a target color candidate belongs to the designated color range; therefore, it is possible to select, from the candidates for the target color of a plurality of similar colors, and register a desired target color. In addition, with the configuration in which such a color range is designated first, it is possible to establish a configuration in which the target color extracting unit 406 automatically extracts target color candidates for all of the target color registration image data. Alternatively, it is possible to establish a configuration in which the target color extracting unit 406 automatically extracts target color candidates, for a previously designated region associated with a color range. The previously designated region associated with the color range, for example, if flesh color, is a region detected as the face of a person in the target color registration image data; if blue or red, is an upper part of target color registration image data having a high possibility of the sky being present; and if green, is a lower part of the target color registration image data having a high possibility of a lawn or grass being present. With this configuration, it is possible to omit position designation by the user.

In addition, in the above-mentioned MFP 100, the target color registration unit 408 may be a configuration that registers a registration object target color in the target color storage unit 402 in a case of the target color of the inputted registration object satisfying previously designated color-difference conditions relative to a target color already saved in the target color storage unit 402. Here, as the color-difference condition, the color difference in CIE L*C*h color space between a target color already saved in the target color storage unit 402 and a target color of a registration object being at least a predetermined value (e.g., on the order of 3 to 10) can be employed, for example. With this example, similar colors having little color difference in color space are not registered in the target color storage unit 402. As a result, upon executing color correction, it is possible to prevent a situation in which several similar colors are presented to the user on the target color selection screen 701, and selection of color correction is difficult. It should be noted that, with this configuration, in a case of the inputted target color of the registration object not satisfying the predetermined color-difference condition, the target color registration unit 408 notifies of this fact to the target color extracting unit 406. The target color extracting unit 406 having received the notification notifies the user by displaying a message such as "Very similar color to designated target color already registered." on the touch screen 201. It is thereby possible for the user to know that a similar target color to the selected target color has already been registered, and that registration as a new target color is unnecessary.

Incidentally, the aforementioned example explains a configuration in which the user selects a target color while referencing rectangular images respectively colored by the target colors on the target color selection screen 701, upon conducting color correction. However, in the reproduction of a memory color, it is sought to reproduce images of the colors present as remembered by humans. For this reason, with a configuration selecting a target color by only the rectangular images colored by the target colors, it is considered difficult to determine whether or not the image data after color correction execution approximating to the selected target color matches the imagination of the user. Therefore, a configuration that allows a user to select a target color based on a comparison between the image data prior to color correction and image data after color correction will be explained hereinafter.

Figure 12:
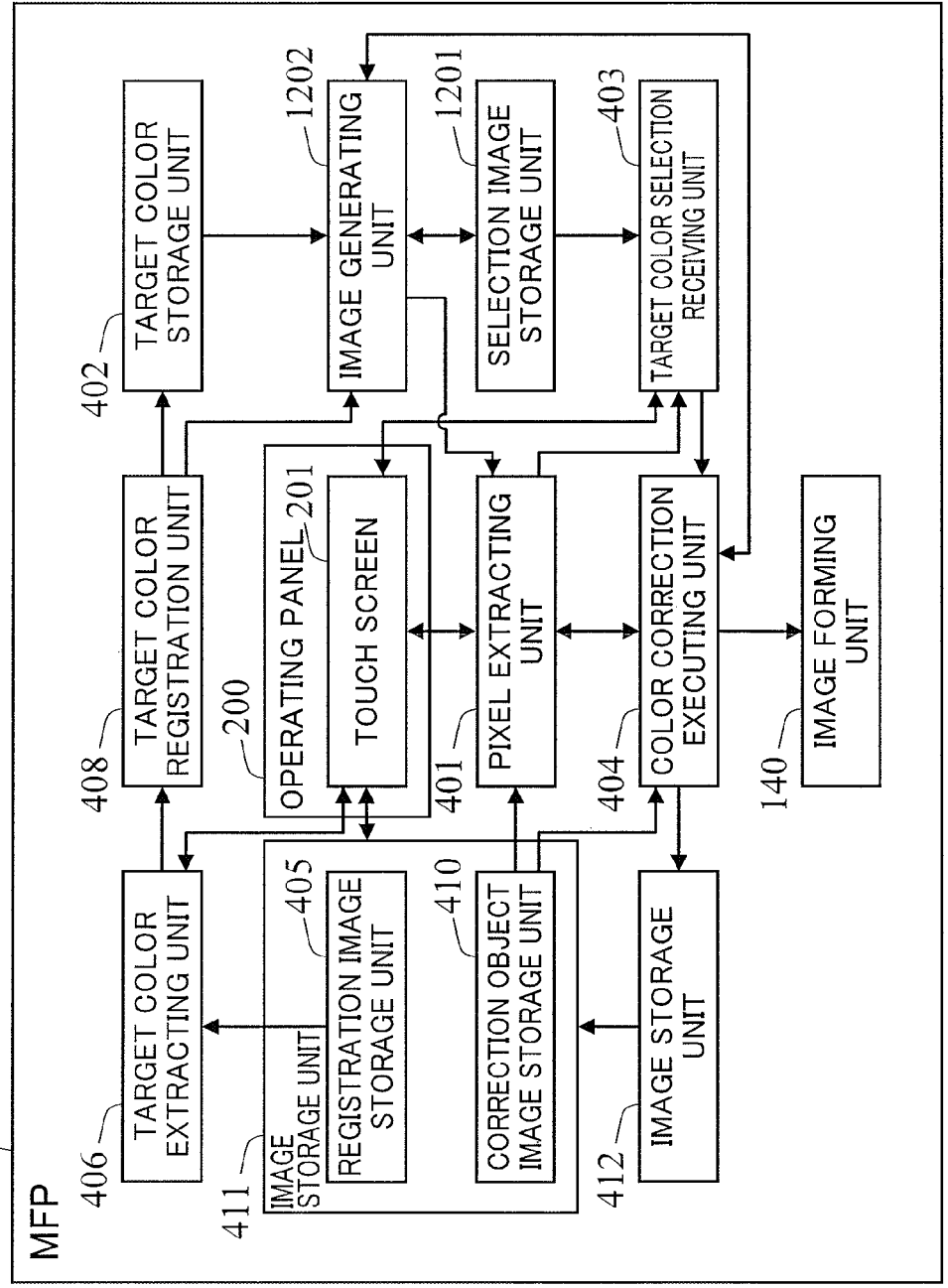
FIG. 12 is a functional block diagram illustrating another MFP according to the first embodiment of the present disclosure.

FIG. 12 is a functional block diagram illustrating another MFP according to the first embodiment. As illustrated in FIG. 12, this other MFP 1200 includes a selection image storage unit 1201 and an image generating unit 1202 in addition to the aforementioned configuration of the MFP 100. It should be noted that, in FIG. 12, components having the same operation and effect as in the MFP 100 illustrated in FIG. 4 are denoted by the same reference numerals. The points of difference with the MFP 100 will be explained in detail hereinafter.

The selection image storage unit 1201 stores selection images for each of the plurality of target colors saved in the target color storage unit 402 to be associated with designated color ranges. Here, selection images are image data showing the appearance of the respective image data in a case of the color correction executing unit 404 executing color correction in accordance with each target color on pixels belonging to the designated color range. In addition, the image generating unit 1202 generates selection images for the target color newly registered in the target color storage unit 402 by the target color registration unit 408, and saves selection images in the selection image storage unit 1201.

In this example, the selection image storage unit 1201 stores sample images as selection images. In other words, the selection image storage unit 1201 saves a specific image according to image range, and an image showing the appearance in a case of the color correction executing unit 404 having conducted color correction corresponding to the target color on the specific image. For example, as described above, when three target colors are registered to one color range, the selection image storage unit 1201 stores a total of four images including one non-corrected image and three corrected images. The three corrected images are obtained by the color correction executing unit 404 executing color correction on the non-corrected image for each of the three target colors. In this example, images in accordance with each color range are saved as non-corrected images. In other words, the selection image storage unit 1201 stores an image in which the flesh of the face or the like of a person occupies many areas in the image as the selection image corresponding to flesh color ("portrait photograph"), an image in which a blue sky or the like occupies many areas in the image as the selection image corresponding to blue ("landscape photography (blue)"), an image in which vegetation occupies many areas in the image as the image for selection corresponding to green ("landscape photography (green)"), and an image in which the sky at sunset or the like occupies many areas in the image as the image or selection corresponding to red ("landscape photography (red)").

With the MFP 1200, the selection images are displayed to the user upon target color selection through the target color selection receiving unit 403. In other words, in place of the rectangular images 702 to 704, these selection images are displayed on the aforementioned target color selection screen 701. The display on the target color selection screen 701 is executed by the target color selection receiving unit 403 reading a selection image corresponding to the target color from the selection image storage unit 1201.

Figure 13:
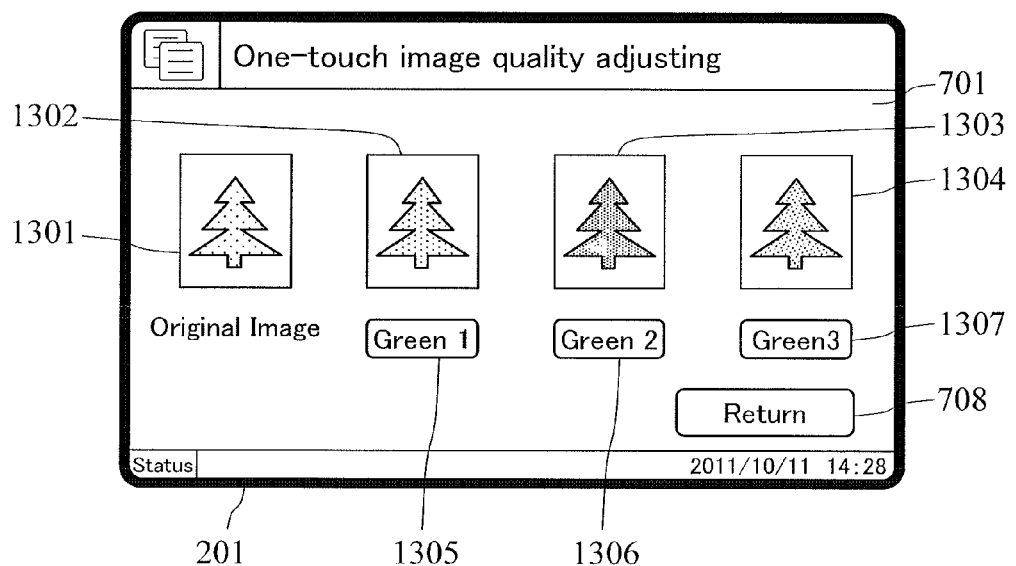
FIG. 13 is a diagram illustrating an example of a target color selection screen displayed by another MFP according to the first embodiment of the present disclosure.

FIG. 13 is a diagram illustrating an example of an target color selection screen 701 displayed by the target color selection receiving part 403 of the MFP 1200 on the touch screen 201. Here, a target color selection screen 701 displayed when the user selects "landscape photography (green)" in the color range selection screen 601 is shown. In this example, the target color selection image 701 includes as selection images the images 1302 to 1302 showing the appearances in cases of executing color correction on a specific image. In FIG. 13, the image 1302 corresponds to a first target color (hereinafter referred to as "green 1"), the selection image 1303 corresponds to a second target color (hereinafter referred to as "green 2"), and the selection image 1304 corresponds to a third target color (hereinafter referred to as "green 3"). In addition, the target color selection screen 701 includes a "green 1" button 1305, "green 2" button 1306 and "green 3" button 1307 used in the selection of target colors corresponding to the respective selection images. It should be noted that the target color selection screen 701 displays the aforementioned non-corrected image on which color correction corresponding to the respective target colors has not been executed as an original image 1301 along with the respective selection images 1302 to 1304. It should be noted that images of trees are used as the selection images in FIG. 13. In addition, the trees of the respective selection images are not monochromatic, and include both colors belonging to the color range of "landscape photography (green)" and colors not belonging to the color range.

It should be noted that, in the first embodiment, the selection image storage unit 1201 saves the aforementioned selection images to be associated with the color information of corresponding target colors. For this reason, depending on the selection of the target color by the user on the target color selection receiving unit 403, the target color selection receiving unit 403 can notify the color information of the target color to the color correction executing unit 404.

Figure 14:
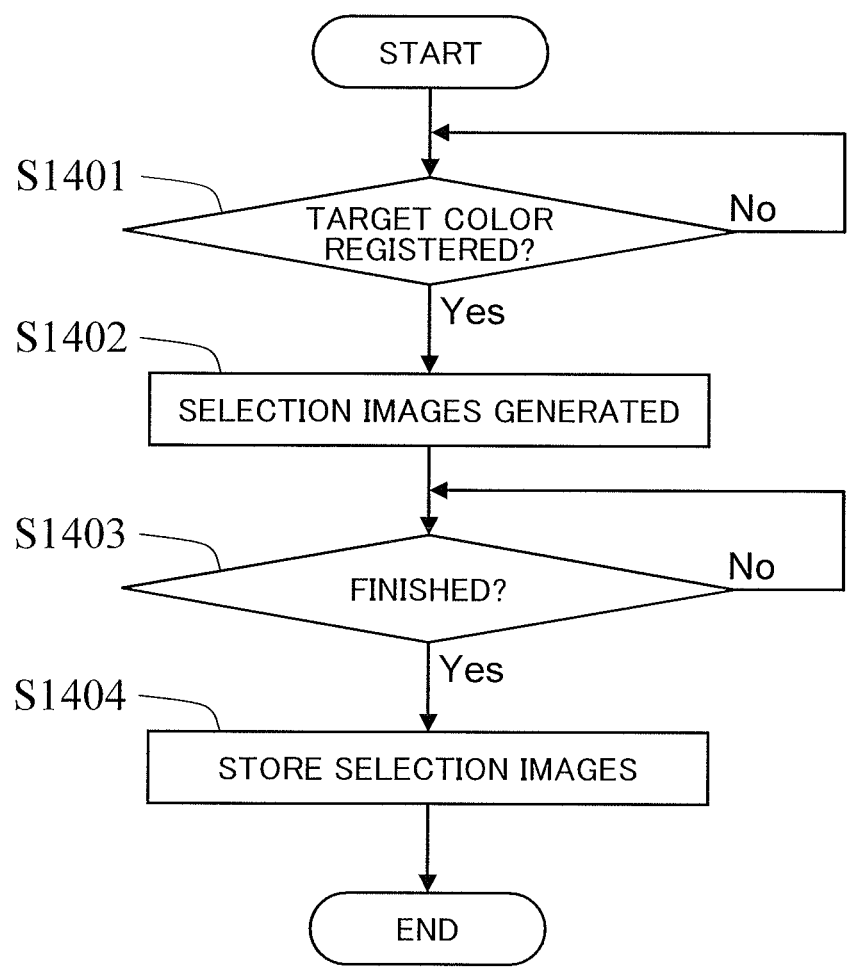
FIG. 14 is a flowchart illustrating an example of a selection image generation procedure conducted by another MFP according to the first embodiment of the present disclosure.

FIG. 14 is a flowchart illustrating an example of a selection image generation process executed by the MFP 1200. This process is started before a new target color is registered in the target color storage unit 402 by the target color registration unit 408 in the target color registration process illustrated in FIG. 8, for example, and advances with the event of the new target color having been registered in the target color storage unit 402 by the target color registration unit 408 as a trigger (Step S1401: YES).

The target color registration unit 408 having registered the new target color in the target color storage unit 402 notifies the image generating unit 1202 of this fact. The image generating unit 1202 having received the notification starts generation of a selection image corresponding to the target color newly registered (Step S1402).

First, the image generating unit 1202 acquires color information of the newly registered target color and a color range with which the target color is associated, from the target color storage unit 402. In addition, the image generating unit 1202 acquires a non-corrected image corresponding to the acquired color range, from the selection image storage unit 1201. The image generating unit 1202 having acquired a non-corrected image inputs the acquired non-corrected image and color information of the newly registered target color to the color correction executing unit 404, as well as inputting the acquired non-corrected image and a color range associated with the registered target color to the pixel extracting unit 401. Then, the image generating unit 1202 is in standby until color correction in the color correction executing unit 404 completes (Step S1403: NO).

In response to the input, according to the aforementioned technique, the pixel extracting unit 401 and the color correction executing unit 404 extract pixels belonging to the inputted color range from the non-corrected image, and conduct the aforementioned color correction on these pixels. The selection image corresponding to the target color newly registered is thereby generated. The color correction executing unit 404 inputs the thus generated selection image to the image generating unit 1202. The image generating unit 1202 having receiving the input saves the selection image thus inputted in the selection image storage unit 1201 to be associated with a color range and target color (Step S1404).

Figure 15:
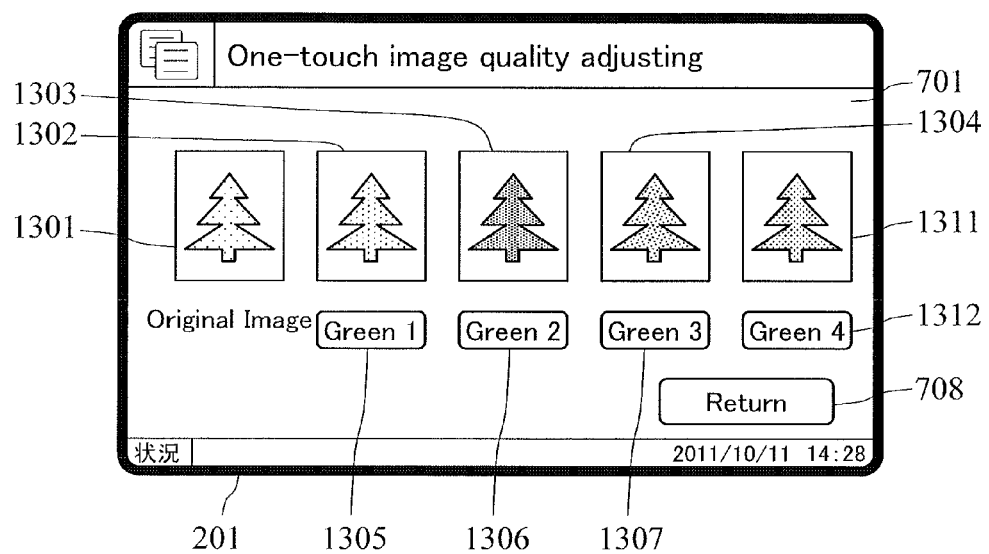
FIG. 15 is a diagram illustrating an example of a target color selection screen displayed by another MFP according to the first embodiment of the present disclosure.

FIG. 15 is a diagram illustrating the target color selection screen 701 displayed when the user selects a target color during color correction execution, after a selection image corresponding to the new target color has been registered in the selection image storage unit 1201 as described above. As illustrated in FIG. 15, the selection image 1311 showing the appearance when executing color correction according to the new target color on the original image 1301 is added as a fourth target color (hereinafter referred to as "green 4") to the target color selection screen 701, and a "green 4" button 1312 used in the selection of the target color corresponding to the selection image 1311 is added. Therefore, the user can select the new registered target color "green 4" while referencing the selection image, in color correction thereafter.

It should be noted that, although the above description establishes a configuration storing the selection images (sample images) based on a different image than the correction object image data in the selection image storage unit 1201, it is not limited thereto. The selection images saved in the selection image storage unit 1201 may be images illustrating an appearance in a case of color correction having been executed according to the respective target colors on the correction object image data, such as thumbnail images of the correction object image data. In this case, whenever correction object image data is selected, the image forming unit 1202 comes to generate selection images corresponding to the correction object image data based on the color information and color range of the target color saved in the target color storage unit 402.

As explained in the foregoing, with this MFP 1200, upon target color selection, the appearances of image data in cases of executing color correction on the same image data with colors different from each other as the target color are displayed to the user. As a result, even in a case of adding a new target color, the user can visually recognize the state of color correction, and the preferred color of the user can be very easily and reliably registered as the target color, along with selection thereof being facilitated.

Next, another embodiment will be explained. In this embodiment, mainly aspects differing from the first embodiment will be the focus of the explanation, the same reference numerals will be assigned for configurations that are the same as the first embodiment, and detailed explanations thereof will be omitted. The explanations in the first embodiment can be applied as appropriate to aspects not particularly explained in this embodiment. In addition, effects similar to the first embodiment are also exerted in this embodiment.

Figure 16:
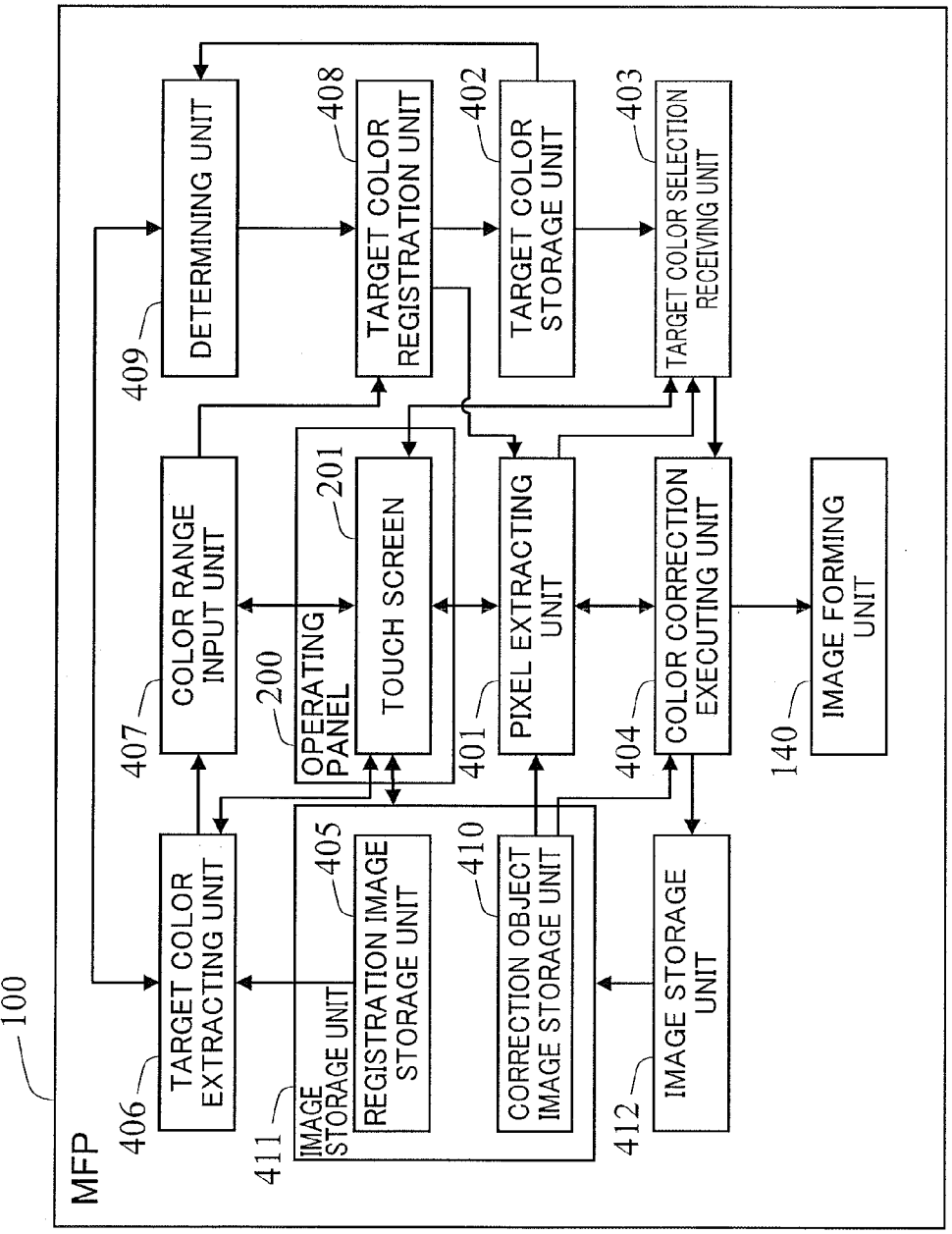
FIG. 16 is a functional block diagram illustrating an MFP according to a second embodiment of the present disclosure.

FIG. 16 is a functional block diagram of an MFP according to a second embodiment. As illustrated in FIG. 16, the MFP 100 of the second embodiment includes a pixel extracting unit 401, a target color storage unit 402, a target color selection receiving unit 403, a color correction executing unit 404, a registration image storage unit 405, a target color extracting unit 406, a color range input unit 407, a target color registration unit 408, a determining unit 409 and a correction object image storage unit 410. The pixel extracting unit 401, target color storage unit 402, target color selection receiving unit 403, color correction executing unit 404 and corrected target image storage unit 410 realize functions to conduct color correction to approximate the color of pixels belonging to a predetermined color range to a target color in the image data in the MFP 100. In addition, the registration image storage unit 405, target color extracting unit 406, color range input unit 407, target color registration unit 408 and determining unit 409 realize functions to register a new target color in the target color storage unit 402 in the MFP 100.

Next, the configuration exerting a function of registering a new target color in the target color storage unit 402 will be explained. As mentioned above, the function of registering a new target color is realized by the registration image storage unit 405, target color extracting unit 406, color range input unit 407, target color registration unit 408 and determining unit 409.

The target color extracting unit 406 extracts a target color of a registration object from the target color registration image data stored in the registration image storage unit 405. As the target color registration image data, the image data saved in the image storage unit 412, image data inputted from the image scanning unit 120, and image data inputted from an external device through the network adapter 161 or the like can be used.

The extraction of a new target color can be executed by designation of a position (point or region) in the target color registration image data by the user, for example. In other words, in a case of only a single color existing at the position designated by the user in the target color registration image data, the image color extracting unit 406 extracts the color as a new target color. In addition, in a case of a plurality of colors existing at the position designated by the user in the target color registration image data, the target color extracting unit 406 suggests the plurality of colors as target color candidates to the user, and the user designates a color to extract as the new target color from among the suggested target color candidates. Alternatively, the target color extracting unit 406 may count the number of pixels for each of these target color candidates, and extract a color having the largest number of pixels as the new target color automatically. It should be noted that even in the case of suggesting the extracted target color candidates to the user, there is no requirement to suggest all thereof, and it is possible to establish a configuration that suggests portions (e.g., on the order of 3) in order of having a larger number of pixels.

In addition, as mentioned above, with the target color storage unit 402, the target color is stored to be associated with a color range, and the new target color must also be stored to be associated with a color range. In the second embodiment, the color range associated with the new target color is input by the user through the color range input unit 407.

The determining unit 409 determines whether or not the target color of the registration object extracted by the target color extracting unit 406 belongs to the color range already registered in the target color storage unit 402. In addition, the target color registration unit 408 registers the target color of the registration object in the target color storage unit 402 to be associated with the new color range inputted to the color range input unit 407, in a case of the determining unit 409 having determined that the target color of the registration object extracted by the target color extracting unit 406 does not belong to the already registered color range.

Next, processes executed by the MFP 100 will be explained. Hereinafter, a process of color correction will first be explained, followed by a registration procedure of a target color being explained.

Figure 17:
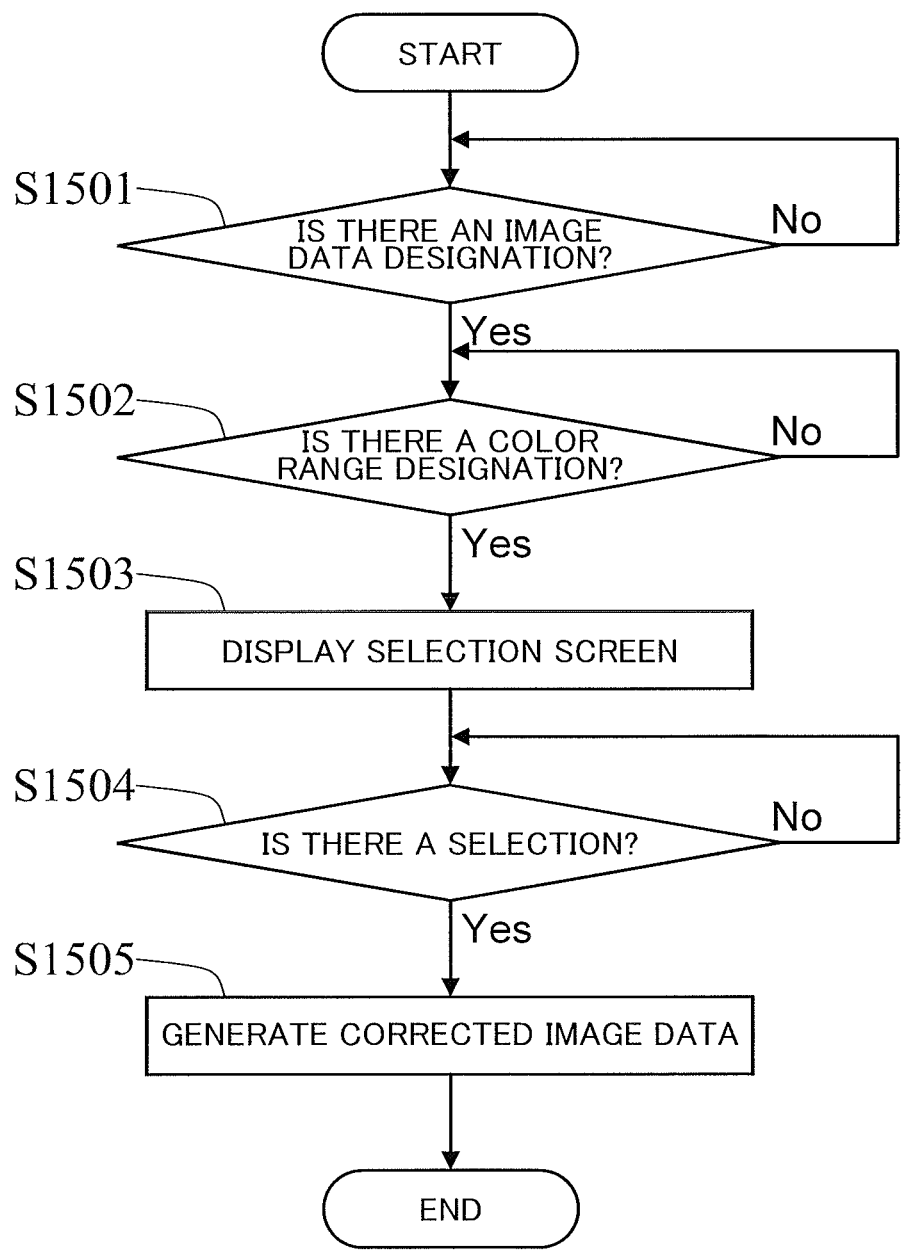
FIG. 17 is a flowchart illustrating an example of a color correction procedure conducted by the MFP according to the second embodiment of the present disclosure.

FIG. 17 is a flowchart illustrating an example of a color correction process executed by the MFP 100. For example, the process advances using the event of a color correction instruction being input by the user as a trigger.

At this time, the pixel extracting unit 401 displays a screen requesting designation of image data on the touch screen 201 and is in standby until image data is designated by the user (Step S1501: NO). The user designates image data to be a color correction object. The selected image data is read from the image storage unit 412 and stored in the correction object image storage unit 410. The correction object image data may be scanned by the image scanning unit 120.

When designation of the image data is completed, the pixel extracting unit 401 displays a screen requesting selection of a color range to be the object of color correction in the correction object image data (designated color range) on the touch screen 201, and is in standby until the color range is selected by the user (Step S1501: YES; Step S1502: NO). The user selects a color to be a correction object.

Figure 18:
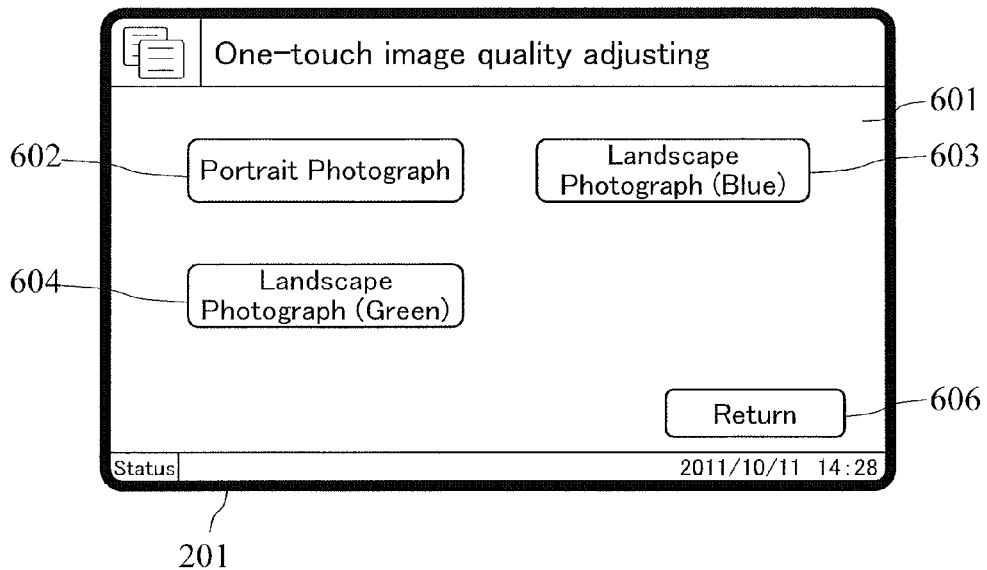
FIG. 18 is a diagram illustrating an example of a color range selection screen displayed by the MFP according to the second embodiment of the present disclosure.

FIG. 18 is a diagram illustrating an example of a color range selection screen displayed on the touch screen 201 at this time. In this example, a color range selection screen 601 includes selecting buttons 602 to 604 used in the selection of a color range, and a "return" button 606. The "return" button 606 is used for interrupting a selection operation and returning to the designation of image data. FIG. 18 illustrates an example in which a "portrait photograph" button 602 corresponding to a flesh color which is one memory color, a "landscape photograph (blue)" button 603 corresponding to a blue color which is one memory color, and a "landscape photograph (green)" button 604 corresponding to a green color which is one memory color are arranged as examples of the selecting buttons. When the user selects one button from among the selecting buttons 602 to 604, the pixel extracting unit 401 sets a color range associated with the selected button (memory color) as a designated color range used for pixel extraction.

The pixel extracting unit 401 having received designation of a color range notifies the target color selection receiving unit 403 of information indicating the color range (hereinafter referred to as color range identifier). The target color selection receiving unit 403 having received the notification displays a screen to receive selection of a target color by the user on the touch screen 201, and is in standby until the user selects a target color (Step S1502: YES; Steps S1503 and S1504: NO). The target color selection receiving unit 403 displays each target color registered in the target color storage unit 402 to be associated with the notified color range on the screen.

Figure 19:
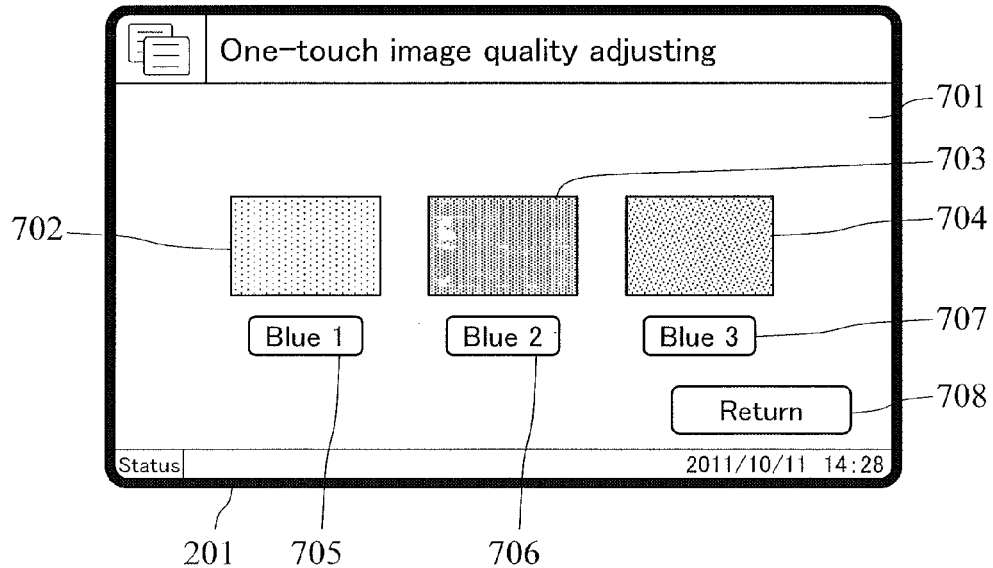
FIG. 19 is a diagram illustrating an example of a target color selection screen displayed by the MFP according to the second embodiment of the present disclosure.

FIG. 19 is a diagram illustrating an example of a target color selection screen displayed on the touch screen 201 at this time. In this example, the target color selection screen 701 includes rectangular images 702 to 704 colored in each target color. In this diagram, the rectangular image 702 corresponds to a first target color (hereinafter referred to as "blue 1"), the rectangular image 703 corresponds to a second target color (hereinafter referred to as "blue 2"), and the rectangular image 704 corresponds to a third target color (hereinafter referred to as "blue 3"). In addition, the target color selection screen 701 includes a "blue 1" button 705, a "blue 2" button 706 and a "blue 3" button 707 used for selecting the target color corresponding to the respective rectangular images, and a "return" button 708. The "return" button 708 is used for interrupting a selection operation and returning to the color range selection screen 601.

When the user selects any one of the "blue 1" button 705, the "blue 2" button 706, and the "blue 3" button 707 in the target color selection screen 701 illustrated in FIG. 19, the target color selection receiving unit 403 inputs color information of the selected target color to the color correction executing unit 404 (Step S1504: YES). For example, in FIG. 19, when the user selects the "blue 2" button 706, the target color selection receiving unit 403 inputs the color information of the target color "blue 2" to the color correction executing unit 404.

The color correction executing unit 404 to which the color information of the target color has been input notifies the pixel extracting unit 401 of the start of color correction. The pixel extracting unit 401 having received the notice extracts pixels having colors belonging to the designated color range from the image data stored in the correction object image storage unit 410. The pixel extracting unit 401 inputs the color information of the extracted pixels and the positional information in the image data of these pixels to the color correction executing unit 404. The color correction executing unit 404 having received the input calculates a color correction quantity for each pixel extracted by the aforementioned technique, based on the color information of the target color and the color information inputted from the pixel extracting unit 401, and obtains corrected color information for each extracted pixel. The color correction executing unit 404 executes color correction by acquiring image data stored in the correction object image storage unit 410 and converting the color of a pixel corresponding to the positional information inputted from the pixel extracting unit 401 to the corrected color (Step S1505).

The color-corrected image data generated by the color correction executing unit 404 in the above described manner is output from the color correction executing unit 404 such that the color-corrected image data is printed by the image forming unit 140 or stored in the image storage unit 412.

Figure 20:
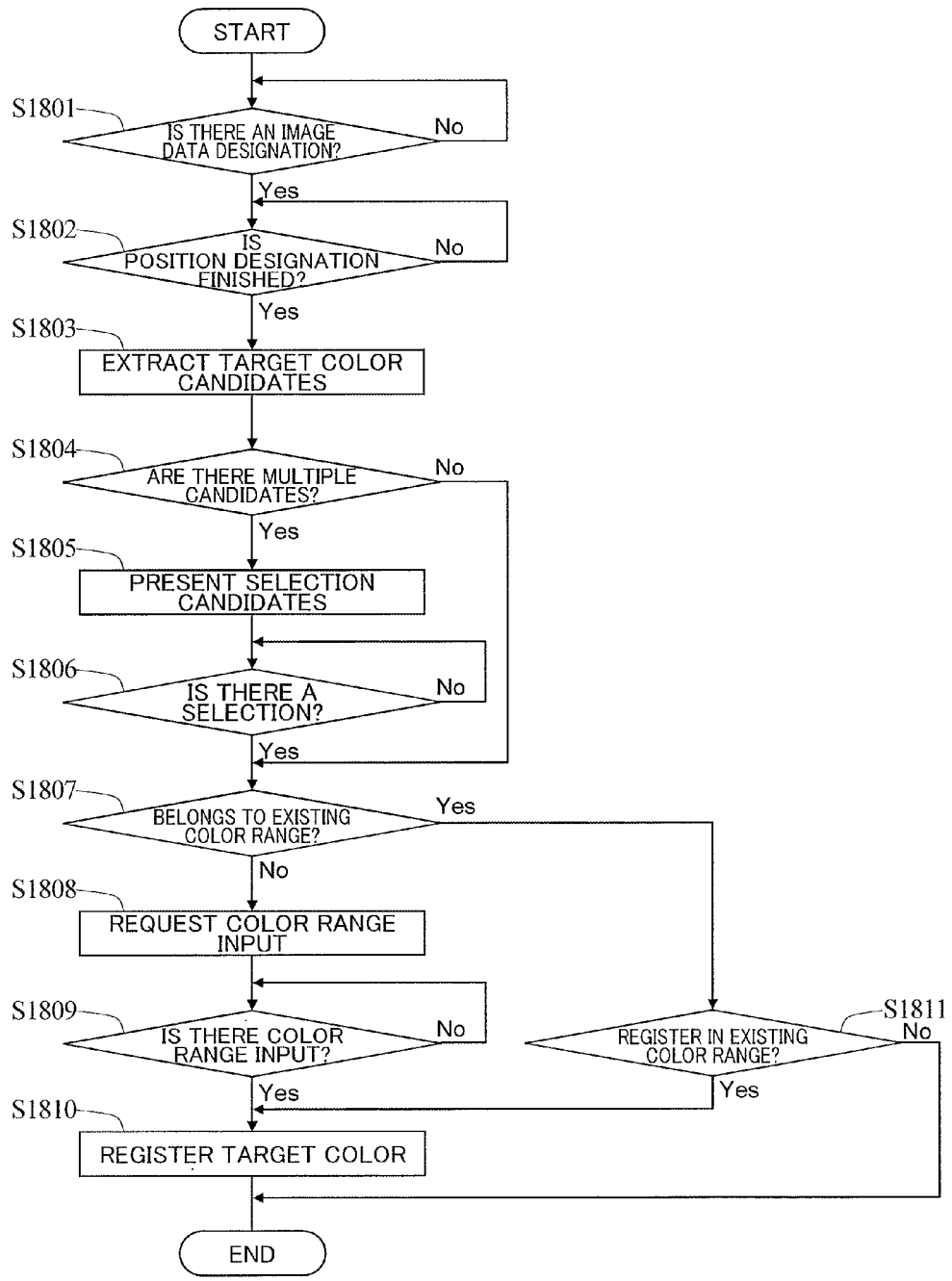
FIG. 20 is a flowchart illustrating an example of a target color registration procedure conducted by the MFP according to the second embodiment of the present disclosure.

Next, a process for registration of a target color executed by the MFP 100 will be explained. FIG. 20 is a flowchart illustrating an example of a target color registration process executed by the MFP 100. Here, an example of registering a color of the red system not included in any of the color ranges of the aforementioned "portrait photograph", "landscape photograph (blue) and "landscape photograph (green)" as the target color will be explained. This process advances with an event of a target color registration instruction by the user having been input as a trigger, for example. It should be noted that the target color registration instruction is input to the MFP 100 by the user pressing the "target color registration" button included on the "color/image quality" tab of the operation screen, as described above.

At this time, the target color extracting unit 406 displays a screen requesting an image data designation on the touch screen 201, and is in standby until the user designates image data (Step S1801: NO). The user designates target color registration image data including the target color in the image. The designation method is not particularly limited. For example, in a case of designating image data saved in the image storage unit 412 as the target color registration image data, it is sufficient to display a list of image data saved in the image storage unit 412 on the touch screen 201, and to select image data read from the list. The selected image data is read from the image storage unit 412 and stored in the registration image storage unit 405. In the example, the image data of an image showing the ocean during the evening is used as the target color registration image data. This image includes the sun, sky at sunset and the ocean. The target color registration image data may be scanned by the image scanning unit 120. In this case, the user sets an original document of the registration object on a document tray of the document feeder 110 and instructs the MFP 100 to start a scanning operation by pressing the start key or the like. The image data scanned by the image scanning unit 120 is stored in the registration image storage unit 410.

When designation of the image data completes, the target color extracting unit 406 displays a screen requesting designation of a position (point or region) at which the target color to be registered is present in the target color registration image data on the touch screen 201, and is in standby until the user selected a position (Step S1801: YES; Step S1802: NO). The user designates the position at which the target color to be registered is present.

Figure 21:
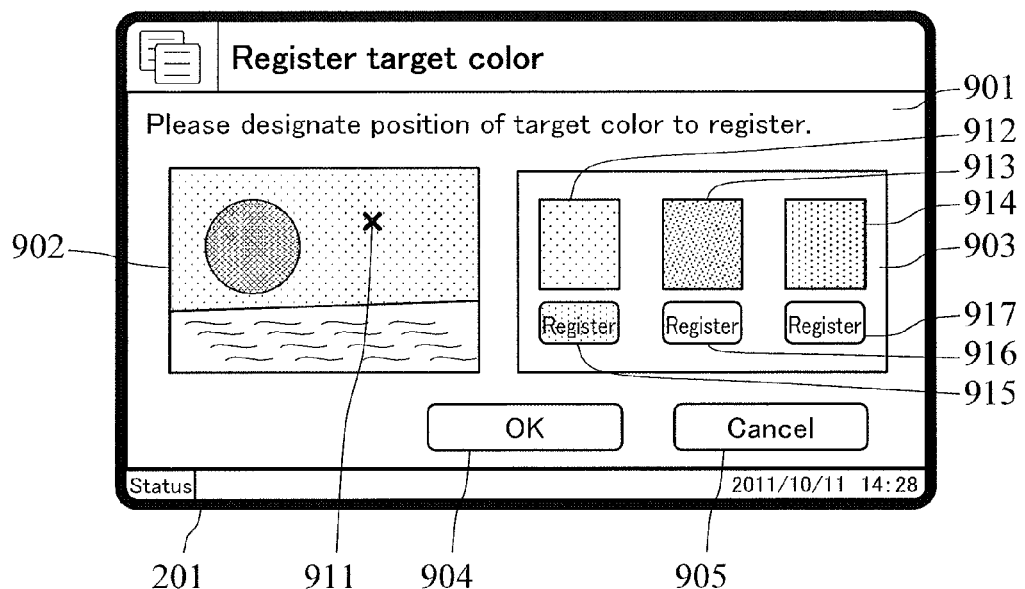
FIG. 21 is a diagram illustrating an example of a target color position designation screen displayed by the MFP according to the second embodiment of the present disclosure.

FIG. 21 is a diagram illustrating an example of a target color position designation screen displayed on the touch screen 201 at this time. In this example, a target color position designation screen 901 includes a preview display portion 902 displaying the aforementioned target color registration image data, target color selection portion 903, "OK" button 904 and "cancel" button 905. The target color selection portion 903 displays target color candidates extracted in accordance with the position designation by the user, as well as receiving a selection by the user. The "OK" button 904 is selected upon fixing the selection of the user at the target color selection portion 903. The "cancel" button 905 is used upon interrupting selection and returning to the immediately prior operation screen (here, the designation screen of target color registration image data). It should be noted that, although not particularly limited, here, a thumbnail image in which the number of pixels for the target image registration image data designated as described above is reduced to a size appropriate to display is displayed on the preview display part 902. Here, the thumbnail image is generated by the target color extracting unit 406.

On the target color position designation screen 901, the user uses their finger or a touch pen 202 to designate the position in the target color registration image data displayed in the preview display portion 902 at which a target color desired to be registered is present (Step S1802: YES). Here, the user has designated a point 911 (a portion of the sky at sunset in the image) shown in FIG. 21. In response to the designation, the target color extracting unit 406 extracts the color information of the pixel present at the point (or region including the point) in the target color registration image data corresponding to the point 911 designated by the user in the thumbnail image displayed on the preview display portion 902 (Step S1803). This color information is a target color candidate. It should be noted that the color information may be one color or may be a plurality of colors, as described above. Here, the target color extracting unit 406 extracts a plurality of target color candidates, and specifies, from among the plurality of target color candidates, the target color candidates of three colors in order larger number of pixels.

The target color extracting unit 406 specifying a plurality of target color candidates corresponding to the designated position of the user displays these specified target color candidates on the target color selection portion 903 of the target color position designation screen 901, and is in standby under the users makes a selection (Step S1804: YES; Steps S1805, S1806: NO). As shown in FIG. 21, the target color selection portion 903 includes rectangular images 912 to 914 colored by the respective target color candidates, and "register" buttons 915 to 917 used in selection of the target colors corresponding to the respective rectangular images. This example shows a situation in which the "register" button 915 corresponding to the target color candidate 912 being displayed on the left side in the target color selection portion 903 has been selected.

When the user selects the "OK" button 904 in the situation, the target color extracting unit 406 inputs color information of the selected target color to the determining unit 409. In response to the input, the determining unit 409 determines whether the target color inputted from the target color extracting unit 406 belongs to a color range already registered in the target color storage unit 402 (Step S1806: YES; Step S1807). As described above, in this example, the inputted target color is not included in any of the existing color ranges registered in the target color storage unit 402 (herein, "portrait photograph", "landscape photograph (blue) and "landscape photograph (green)"). Therefore, the determining unit 409 determines that the target color extracted by the target color extracting unit 406 does not belong to an existing color range (Step S1807: NO). At this time, the determining unit 409 notifies the determination result to the target color extracting unit 406.

The target color extracting unit 406 having received the notification inputs color information of the extracted target color to the color range input unit 407. The color range input unit 407 having received the input requests the user for input of a color range associated with the inputted color information, and is in standby until the input is completed (Steps S1808, S1809: NO).

Figure 22:
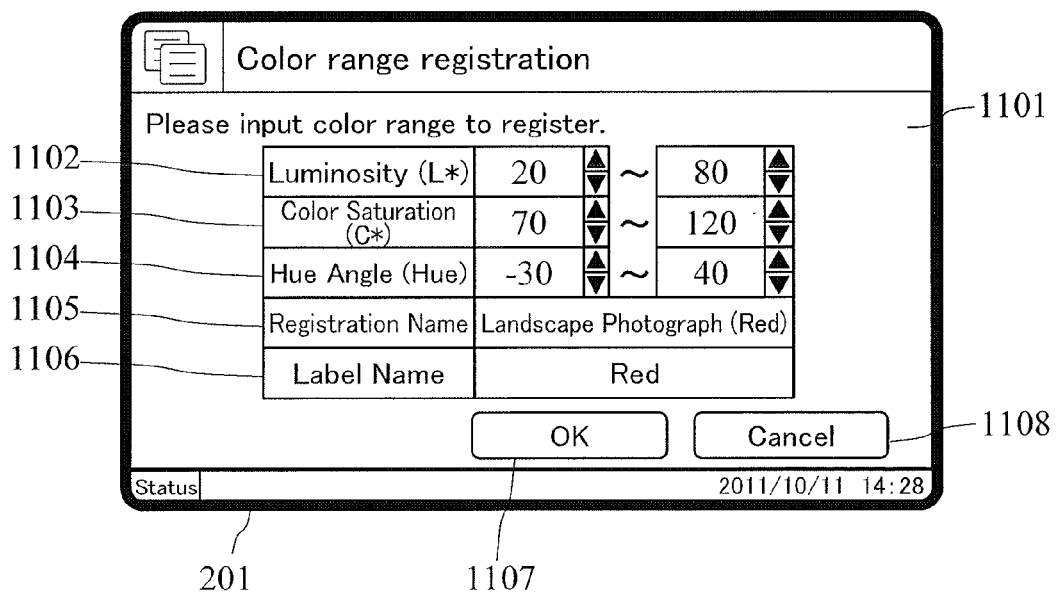
FIG. 22 is a diagram illustrating an example of a color range input screen displayed by the MFP according to the second embodiment of the present disclosure.

FIG. 22 is a diagram illustrating an example of a color range input screen displayed on the touch screen 201 at this time. In this example, the color range input screen 1101 includes a luminosity input field 1102, a color saturation input field 1103, a hue angle input field 1104, a registration name input field 1105 and a label name input field 1106, an "OK" button 1107 selected upon fixing the input in each input field, and a "return" button 1108. The registration name input field 1105 is used in the input of a name attached to a button when selecting a color range in the aforementioned color range selection screen 601. The label name input field 1106 is used in the input of a name attached to a button when selecting the target color in the target color selection screen displayed after the color range selection. The "return button" 1108 is used in order to interrupt a selection operation and return to the target color position designation screen 901.

In the example of FIG. 22, an example is illustrated in which a lower limit "20" and an upper limit "80" are set in the luminosity input field 1102, a lower limit "70" and an upper limit "120" are set in the color saturation input field 1103, and a lower limit of "−30 (330)" and upper limit "40" are set in the hue angle input field 1104. In addition, "landscape photograph (red)" is set in the registration name input field 1105, and "red" is set in the label name input field 1106. In the second embodiment, these setting values are input by the user using the operating keys 203 of the operating panel 200, or a software keypad or the like displayed on the touch screen 201 as necessary. It should be noted that that, for the upper and lower limits in the luminosity input field 1102, color saturation input field 1103 and hue angle input field 1104, for example, it can be make a configuration in which the color range input unit 407 displays the upper and lower limits, etc. that are a range within a fixed color difference around the target color inputted from the target color extracting unit 406 as default values, and the user fine tunes the default values.

When input is fixed by the selection of the "OK" button 1107 by the user, the color range input unit 407 inputs the inputted color range to the target color registration unit 408 along with color information of the target color input from the target color extracting unit 406 (Step S1809: YES). The target color registration unit 408 having received the input registers the color information of the inputted target color in the target color storage unit 402 to be associated with the inputted color range (Step S1810). In addition, the target color registration unit 408 inputs the inputted color range to the pixel extracting unit 401 along with the inputted registration name and label name. The pixel extracting unit 401 having received the input enables selection of the inputted color range in color correction thereafter.

Figure 23:
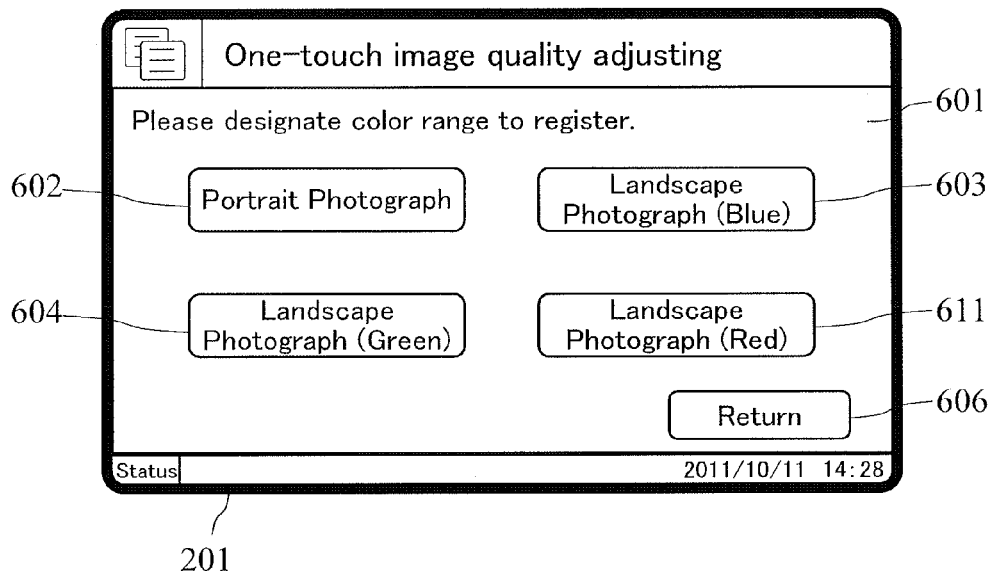
FIG. 23 is a diagram illustrating an example of a color range selection screen displayed by the MFP according to the second embodiment of the present disclosure.

FIG. 23 is a diagram illustrating the color range selection screen 601 displayed when the user selects a target color upon color correction execution after a new target color has been registered in the target color storage unit 402 as described above. In the aforementioned example, the user inputs the registration name "(landscape photograph (red)" in the color range input screen 1101. As a result, the color range selection screen 601 after new target color registration includes, in addition to the "portrait photograph" button 602 corresponding to a flesh color, the "landscape photograph (blue)" button 603 corresponding to a blue color and the "landscape photograph (green)" button 604 corresponding to a green color as selecting buttons, a "landscape photography (red)" button 611 corresponding to red, as shown in FIG. 23.

Figure 24:
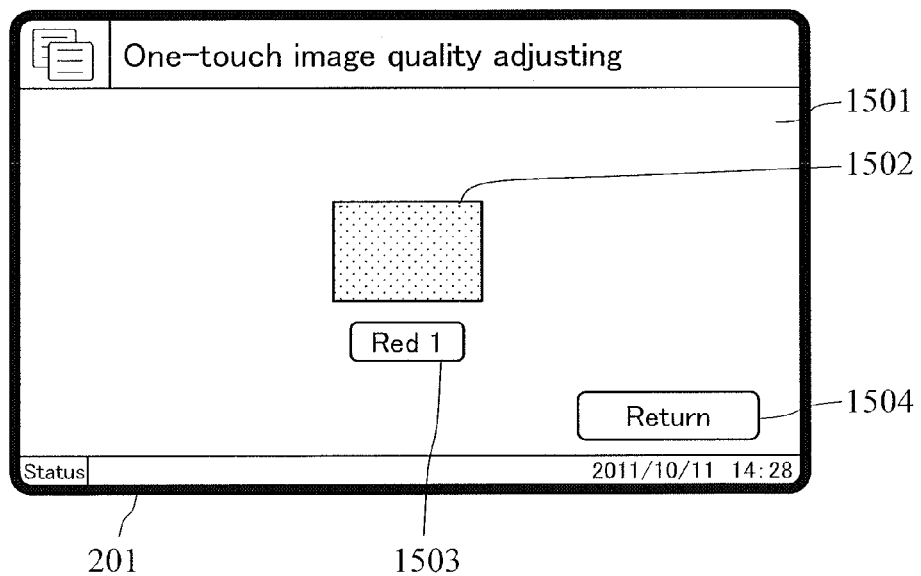
FIG. 24 is a diagram illustrating an example of a target color selection screen displayed by the MFP according to the second embodiment of the present disclosure.

FIG. 24 is a diagram illustrating the target color selection screen displayed when the user selects the "landscape photography (red)" button 611 on the color range selection screen 601 shown in FIG. 23. In the aforementioned example, the user inputs the label name "red" in the color range input screen 1101. As a result, the target color selection screen 1501 corresponding to "landscape photography (red)" includes a rectangular image 1502 colored by the target color newly registered, a "red 1" button 1503 used in selection of the target color corresponding to the rectangular image 1502, and a "return" button 1504. The "return" button 1504 is used in order to interrupt a selection operation and return to the color range selection screen 601. Therefore, the user can select the newly registered target color by selecting the "red 1" button 1503 on the target color selection screen 1201.

On the other hand, in the aforementioned determination step (Step S1807), in a case of the determining unit 409 having determined that the target color extracted by the target color extracting unit 406 belongs to an existing color range (Step S1807: YES), the determining unit 409 notifies the target color extracting unit 406 of the determination result.

The target color extracting unit 406 having receiving the notification inquires with the user as to whether or not to register as a target color belonging to an existing color range (Step S1811). At this time, the target color extracting unit 406 inquires with the user, for example, by displaying on the touch screen 201 a button allowing for selection of "register" or "don't register". When a reply is input, the target color extracting unit 406 notifies the determining unit 409 of the reply.

In a case of the inputted reply being "register", the determining unit 409 inputs, to the target color registration unit 408, color information of the target color inputted from the target color extracting unit 406 and a color range already registered in the target color storage unit 402 to which the target color belongs (Step S1811: YES). The target color registration unit 408 having received the input registers the color information of the inputted target color in the target color storage unit 402 to be associated with the inputted color range (Step S1810). In addition, in a case of the inputted reply being "don't register", the determining unit 409 finishes the procedure without particularly doing anything (Step S1811: NO). It should be noted that it may be a configuration in which, in the case of the inputted reply being "don't register", the user registers the registration object target color in the target color storage unit 402 to be associated with a new color range. In this case, the target color extracting unit 406 having receiving the reply of "don't register" then comes to request the user for input of a color range by way of the color range input unit 407 (Step S1808).

It should be noted that, although not particularly limited, in a case of the target color candidates extracted by the target color extracting unit 406 in the extracting step of target color candidates in accordance with the aforementioned position designation of the user (Step S1804) being one color in the second embodiment, the target color extracting unit 406 requests the user for designation of a color range without requesting for selection of the target color candidate (Step S1804: NO; Step S1807).

As explained above, since this MFP 100 registers a target color using the image data itself, the user can register a color included in an image confirmed through visual observation as the target color. In addition, it is possible to set a color range to be the object color correcting to the target color of the registration object. For this reason, even if a color such as a memory color not set in the image processing apparatus, it is possible to register a preferred color of the user as the target color. As a result, upon executing color correction, the user can easily execute color correction to a preferred color.

In addition, with the MFP 100, in a case of a plurality of colors being included in the target color registration image data, the user can select a desired target color from the presented candidates of target colors. In other words, the preferred color of the user can be very easily and reliably registered as a target color.

Furthermore, the MFP 100 is a configuration that registers the target color of the registration object in the target color storage unit 402, in a case of the determining unit 409 having determined the target color of a registration object as not belonging to an existing color range. For this reason, proximate colors having little color difference in color space will not be registered as the target color of a different color range. As a result, it is possible to prevent entering a situation upon executing color correction in which several proximate color ranges are presented to the user, and the selection of color correction is difficult.

It should be noted that, instead of the aforementioned determination in the above determining step (Step S1807), the determining unit 409 may determine whether or not a target color inputted from the target color extracting unit 406 satisfies a previously designated color difference condition relative to an existing target color registered in the target color storage unit 402. Herein, as the color difference condition, for example, it is possible to use the color difference in CIE L*C*h color space between the target color already stored in the target color storage unit 402 and the target color of the registration object being at least a predetermined value (e.g., on the order of 30 to 50), etc. With this configuration, the same effects as the aforementioned effects can be obtained by registering a new target color and a new color range in the target color storage unit 402 when the color difference condition is satisfied, for example. It should be noted that the determination of whether or not the target color inputted from the target color extracting unit 406 belongs to an existing color range registered in the target color storage unit 402 and the determination of whether or not the target color satisfies a previously designated color difference condition relative to an existing target color registered in the target color registration unit 402 can be jointly used.

In addition, although the second embodiment explains an MFP including the determining unit 409 as a particularly preferable form, it is not limited thereto. Even in a case of not including the determining unit 409, the user can at least register a color included in an image confirmed through visual observation as a target color, and can set a color range to be the object color correcting to the target color of the registration object.

With this configuration, if the target color of the registration object is selected in the target color selection step shown in FIG. 20 (Step S1806), the target color extracting unit 406 inputs color information of the selected target color to the color range input unit 407. The color range input unit 407 having receiving the input requests the user for input of a color range associated with the inputted color information, and is in standby until is the input is completed (Steps S1808, S1809: NO). When the input of the color range by the user is completed, the color range input unit 407 inputs the inputted color range and color information of the inputted target color from the target color extracting unit 406 into the target color registration unit 408 (Step S1809: YES). The target color registration unit 408 having received the input registers the color information of the inputted target color in the target color storage unit 402 to be associated with the inputted color range (Step S1810). In addition, the target color registration unit 408 inputs the inputted color range into the pixel extracting unit 401 along with the input registration name and label name.

The above embodiments are not intended to limit a technical scope of the present disclosure, and various modification or applications can be made within the scope of the present disclosure besides the above described ones. For example, according to the above embodiments, an operation is made through the operation panel of the MFP. However, an operation on the MFP may be made through an information processing terminal communicably connected to the MFP. In this case, the function of the touch screen 201 of the operating panel 200 in the above embodiments is provided by a display means such as a display and an input means such as a keyboard which are included in the information processing terminal.

In addition, in the aforementioned flowcharts, the order of each step may be appropriately changed to the extent that an equivalent effect is obtained. For example, the input step of the color range by the user in FIG. 20 (Steps S1808, S1809) can also be executed prior to designation of the image data or prior to position designation on target color registration image data. In this case, it becomes possible for the target color extracting unit 406 to extract only color information belonging to the inputted color range upon extracting target color candidates. If configured in this way, it is possible to prevent color information for which registering as the target color of the inputted color range is inappropriate from being extracted as a target color candidate. In addition, since the color information extracted as a target color candidate belong to the inputted color range, it is possible to select and register a desired target color from among the candidates of target colors of a plurality of proximate colors. Moreover, with the configuration in which such a color range is inputted first, it is possible to make a configuration in which the target color extracting unit 406 automatically extracts target color candidates for all of the target color registration image data.

Furthermore, an image indicating the appearance of image data after color correction may be used instead of the rectangular image indicating the target color displayed on the target color selection screen in the aforementioned embodiments. In this case, the image data displayed may employ either thumbnail images of correction object image data or images differing from the correction object data. In this case, it is preferable to display an image indicating the appearance of the image data prior to color correction on the target color selection screen. It should be noted that the image data after color correction can be generated by the pixel extracting unit 401 and the color correction executing unit 404 executing color correction in accordance with a color range and target color stored in the target color storage unit 402.

In addition, in the above embodiments, although the present disclosure has been embodied as a digital MFP, it is not limited thereto. Not limiting to the digital MFP, the present disclosure can be applied to any image processing apparatus such as a printer or a copying machine.

What is claimed is:

1. An image processing apparatus that executes color correction on image data, comprising:
   a pixel extracting unit that extracts a pixel belonging to a previously designated color range, from image data of a correction object;
   a target color storage unit that stores a plurality of target colors to be associated with the previously designated color range;
   a target color selection receiving unit that receives a selection of one target color by a user from among the plurality of target colors stored in the target color storage unit;
   a color correction executing unit that executes color correction on the image data of the correction object, based on a color of a pixel extracted by the pixel extracting unit and a target color selected through the target color selection receiving unit;
   a registration image storage unit that stores image data including a target color of a registration object;
   a target color extracting unit that extracts the target color of the registration object from image data stored in the registration image storage unit; and
   a target color registration unit that registers the target color of the registration object extracted by the target color extracting unit in the target color storage unit to be associated with the previously designated color range.

2. The image processing apparatus according to claim 1, wherein the target color extracting unit extracts pixels within a previously designated area of image data, displays colors of the pixels thus extracted as candidates of a registration object target color, and receives selection of the registration object target color by a user.

3. The image processing apparatus according to claim 2, wherein the target color extracting unit extracts only pixels belonging to the previously designated color range.

4. The image processing apparatus according to claim 1, wherein the target color registration unit registers a registration object target color in the target color storage unit, in a case of the registration object target color satisfying previously designated color difference conditions relative to a target color already stored in the target color storage unit.

5. The image processing apparatus according to claim 1, further comprising:
   a selection image storage unit that stores selection images which indicate the appearance of respective image data in a case of the color correction executing unit having executed color correction for each of a plurality of target colors stored in the target color storage unit on pixels belonging to the previously designated color range, and which are displayed to a user upon target color selection through the target color selection receiving unit; and
   an image generating unit that generates and stores, in the selection image storage unit, the selection image for a target color newly registered in the target color storage unit.

6. An image processing apparatus that executes color correction on image data, comprising:
   a pixel extracting unit that extracts a pixel belonging to a previously designated color range, from image data of a correction object;
   a target color storage unit that stores a plurality of target colors to be associated with the previously designated color range;
   a target color selection receiving unit that receives a selection of one target color by a user from among the plurality of target colors stored in the target color storage unit;
   a color correction executing unit that executes color correction on the image data of the correction object, based on a color of a pixel extracted by the pixel extracting unit and a target color selected through the target color selection receiving unit;
   a registration image storage unit that stores image data including a target color of a registration object;
   a target color extracting unit that extracts the target color of the registration object from image data stored in the registration image storage unit; and
   a color range input unit to which a new color range associated with a target color of a registration object extracted by the target color extracting unit is input; and
   a target color registration unit that registers the target color of the registration object extracted by the target color extracting unit in the target color storage unit to be associated with the new color range input to the color range input unit.

7. The image processing apparatus according to claim 6, wherein the target color extracting unit extracts pixels within a previously designated area of image data, displays colors of the pixels thus extracted as candidates of a registration object target color, and receives selection of the registration object target color by a user.

8. The image processing apparatus according to claim 6, further comprising a determining unit that determines whether the target color of the registration object extracted by the target color extracting unit belongs to a color range already registered in the target color storage unit,
   wherein the target color registration unit registers the target color of the registration object extracted by the target color extracting unit in the target color storage unit to be associated with a new color range inputted to the color range input unit, in a case of the determining unit having determined as not belonging to a color range already registered.

9. The image processing apparatus according to claim 6, further comprising a determining unit that determines whether the target color of the registration object extracted by the target color extracting unit satisfies a previously designated color difference condition relative to a target color already registered in the target color storage unit,
   wherein the target color registration unit registers the target color of the registration object extracted by the target color extracting unit in the target color storage unit to be associated with a new color range inputted to the color range input unit, in a case of the determining unit having determined as satisfying color difference conditions.

* * * * *